United States Patent
Takeda et al.

(10) Patent No.: US 9,678,344 B2
(45) Date of Patent: Jun. 13, 2017

(54) VIRTUAL IMAGE DISPLAY APPARATUS WITH REGISTRATION MECHANISM

(71) Applicant: SEIKO EPSON CORPORATION, Tokyo (JP)

(72) Inventors: Takashi Takeda, Suwa (JP); Takahiro Totani, Suwa (JP); Akira Komatsu, Kamiina-gun (JP); Masayuki Takagi, Shiojiri (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 302 days.

(21) Appl. No.: 13/783,913

(22) Filed: Mar. 4, 2013

(65) Prior Publication Data
US 2013/0234915 A1    Sep. 12, 2013

(30) Foreign Application Priority Data
Mar. 8, 2012    (JP) .................................. 2012-051325

(51) Int. Cl.
*G02B 27/01*    (2006.01)

(52) U.S. Cl.
CPC .. *G02B 27/0172* (2013.01); *G02B 2027/0154* (2013.01)

(58) Field of Classification Search
CPC .... G02B 5/0252; G02B 27/01; G02B 27/017; G02B 2027/0178; G02B 27/0149; G02B 27/02; G02B 27/0172
USPC ................. 345/7–9; 359/473, 630–631, 507; 313/524; 353/69; 348/54, 333.01; 473/210, 268
See application file for complete search history.

(56) References Cited

U.S. PATENT DOCUMENTS

| 4,449,787 A * | 5/1984 | Burbo et al. .................. 313/524 |
| 6,124,843 A | 9/2000 | Kodama |
| 6,224,492 B1 * | 5/2001 | Grimes .............. A63B 69/3608 473/210 |
| 6,424,321 B1 * | 7/2002 | Ronzani et al. .................. 345/8 |
| 6,480,174 B1 * | 11/2002 | Kaufmann ......... G02B 27/0172 345/7 |
| 2006/0072206 A1 * | 4/2006 | Tsuyuki et al. ............... 359/631 |

(Continued)

FOREIGN PATENT DOCUMENTS

| JP | H08-202281 A | 8/1996 |
| JP | 2006-108868 A | 4/2006 |

(Continued)

*Primary Examiner* — Jennifer Mehmood
*Assistant Examiner* — James Nokham
(74) *Attorney, Agent, or Firm* — Oliff PLC

(57) ABSTRACT

A wearer of a virtual image display apparatus can adjust the position of the virtual image display apparatus relative to the position of each of the wearer's eyes by using a registration mechanism while checking a marker member that is a positioning member, whereby an optimum adjusted position is readily achieved. Further, registration according to person-to-person differences in the position of each of the eyes can be readily achieved, whereby it is not necessary to increase the light flux width of image light in advance or provide the image light with a margin so that the wearer can recognize an image even when the position of the eye deviates from a normal position to some extent, and the size of the apparatus will not increase.

15 Claims, 17 Drawing Sheets

(56) References Cited

U.S. PATENT DOCUMENTS

| | | | |
|---|---|---|---|
| 2009/0146916 A1* | 6/2009 | Moliton et al. ................... | 345/8 |
| 2010/0091377 A1* | 4/2010 | Hedges et al. ................ | 359/630 |
| 2010/0097580 A1* | 4/2010 | Yamamoto et al. ............ | 353/69 |
| 2010/0246023 A1 | 9/2010 | Tanaka | |
| 2011/0102558 A1* | 5/2011 | Moliton et al. ................. | 348/54 |
| 2011/0241975 A1* | 10/2011 | Mukawa et al. .................. | 345/8 |
| 2012/0013984 A1* | 1/2012 | Ikeda ................ | A61B 1/00142 |
| | | | 359/507 |
| 2012/0162764 A1* | 6/2012 | Shimizu ........................ | 359/473 |
| 2013/0050833 A1* | 2/2013 | Lewis et al. .................. | 359/630 |
| 2013/0113973 A1* | 5/2013 | Miao ........................ | 348/333.01 |

FOREIGN PATENT DOCUMENTS

| | | |
|---|---|---|
| JP | 2006-133688 A | 5/2006 |
| JP | A-2007-178941 | 7/2007 |
| JP | 2009-159381 A | 7/2009 |
| JP | 2010-124191 A | 6/2010 |
| JP | 2010-169916 A | 8/2010 |
| JP | 2010-230898 A | 10/2010 |

\* cited by examiner

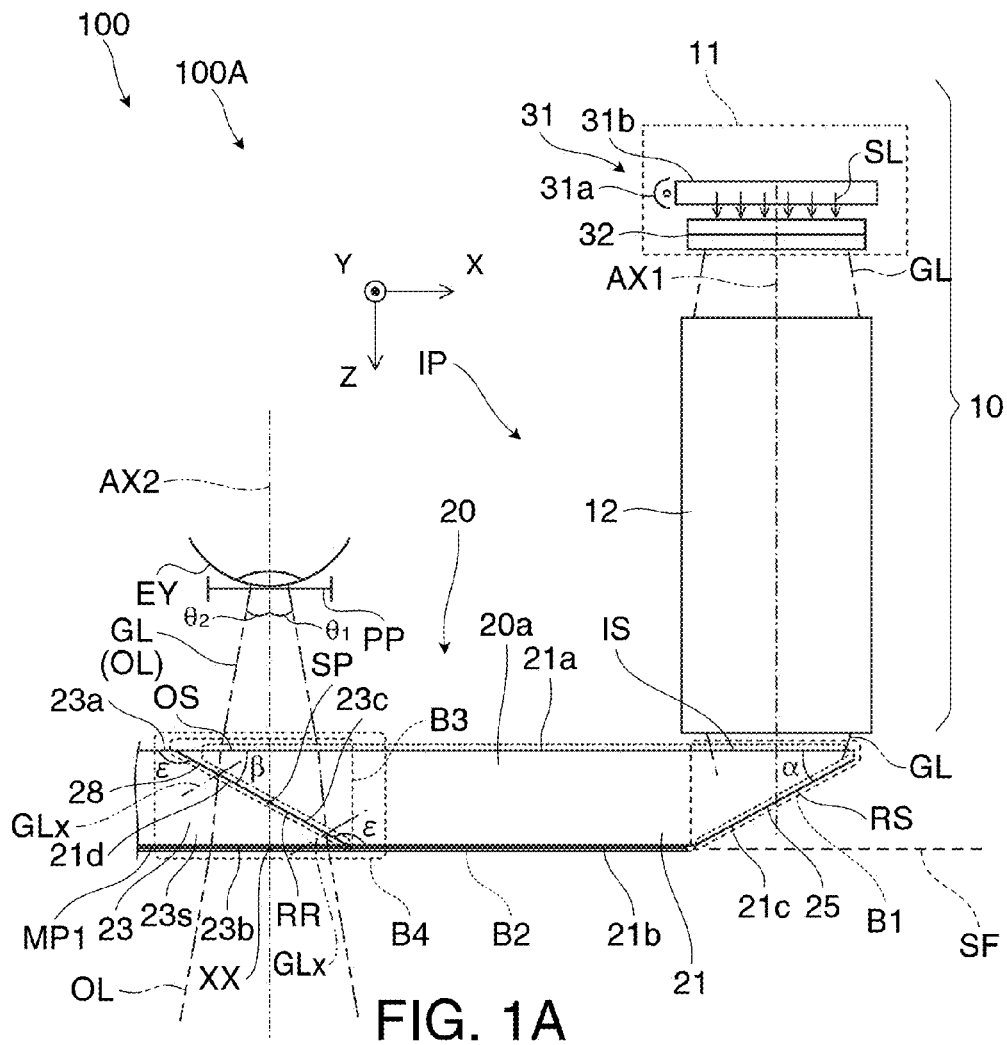
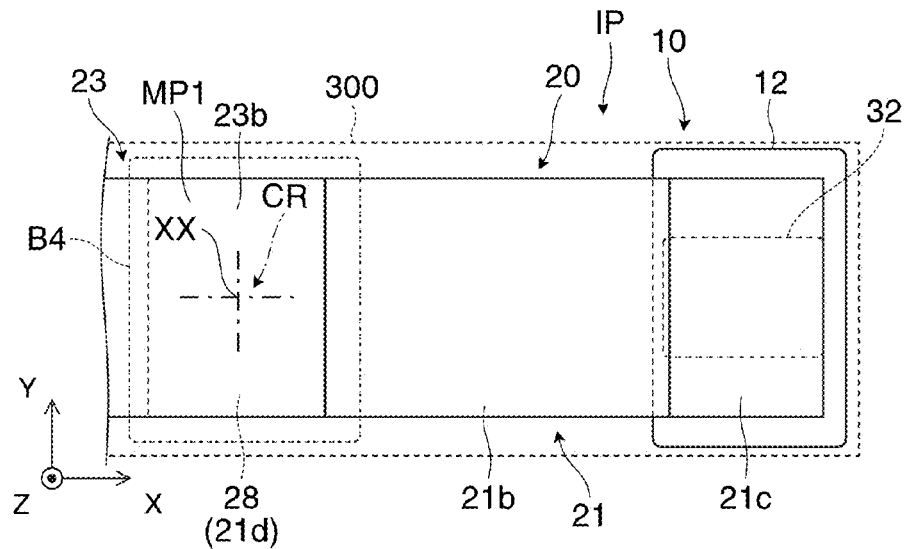

VIRTUAL IMAGE DISPLAY APPARATUS WITH REGISTRATION MECHANISM

BACKGROUND

1. Technical Field

The present invention relates to a virtual image display apparatus, such as a head-mounted display worn around the head for use.

2. Related Art

In recent years, as a virtual image display apparatus capable of formation and observation of a virtual image, such as a head-mounted display, various types of apparatus in which image light from a display device is guided to the pupils of a wearer who is a viewer have been proposed. For example, to superimpose image light that forms a virtual image on environment light that is light from the environment, a see-through-type apparatus has been proposed (see JP-A-2007-178941).

It is, however, not easy for the virtual image display apparatus to reliably guide the image light to the wearer because the positions of the wearer's eyes differ on an individual basis. For example, it is conceivable to increase the light flux width of the image light to provide formed image light with a margin so that the wearer can recognize the image light even when the position of each of the eyes deviates from a normal position to some extent. In this case, however, since the light flux width is increased, the overall optical system needs to be disadvantageously enlarged.

SUMMARY

An advantage of some aspects of the invention is to provide a virtual image display apparatus not only based on a see-through-type apparatus in which image light is superimposed on environment light but also capable of readily making adjustment in accordance with the positions of the eyes without enlargement of the apparatus.

An aspect of the invention is directed to a virtual image display apparatus including (a) a virtual image formation unit that not only transmits environment light but also forms a virtual image from image light, (b) a positioning member that is attached in a predetermined position corresponding to a standard position of an optical system of the virtual image formation unit, the positioning member displaying a marker that allows a wearer in an apparatus worn state in which the wearer is wearing the virtual image formation unit to recognize the standard position and hence works as an index for positioning, and (c) a registration mechanism that moves the optical system of the virtual image formation unit and the positioning member attached to the optical system to adjust the position of the virtual image formation unit relative to a wearer's eye.

In the virtual image display apparatus described above, the wearer can make positional adjustment or registration of the virtual image display apparatus relative to the position of the wearer's eye while checking with the positioning member, whereby an optimum adjusted position is readily achieved. Further, since registration according to person-to-person differences in the position of the eye can be readily achieved, it is not necessary, for example, in the optical design of the virtual image display apparatus, to increase the light flux width of the image light or provide the image light with a margin so that the wearer can recognize an image even when the position of the eye deviates from a normal position to some extent, whereby the size of the apparatus will not increase. Moreover, the virtual image formation unit, which is a see-through-type unit that superimposes the image light and the environment light on each other, allows the wearer to recognize the standard position indicated by the positioning member with the aid of the environment light. Specifically, for example, the wearer who is wearing the virtual image display apparatus achieves the registration while checking the position of the wearer's eye and the standard position indicated by the positioning member with the aid of the environment light by displaying the wearer on a mirror, that is, taking advantage of the fact that the apparatus is a see-through-type apparatus.

In a specific aspect of the invention, the registration mechanism is capable of making the adjustment in the apparatus worn state at least in a direction of an interpupillary distance of the wearer. In this case, since the adjustment can be made in the interpupillary distance direction, optimum adjustment is made with respect to the positions of the wearer's eyes.

In another aspect of the invention, the registration mechanism is capable of making the adjustment along a plane perpendicular to an optical axis in a direction perpendicular to the interpupillary distance direction. In this case, the adjustment can be readily made not only in the interpupillary distance direction, which corresponds to the rightward and leftward directions, but also in the eye height direction, which corresponds to the upward and downward directions.

In still another aspect of the invention, (a) the virtual image formation unit includes (a1) a projection system that projects the image light from an image display section and (a2) a light guide unit having the following portions and forms a virtual image from the image light: a light incident portion that introduces the image light through the projection system into the light guide unit; a light guide portion that guides the image light introduced through the light incident portion; and a light exiting portion that extracts the image light having passed through the light guide portion out of the light guide unit, and (b) the registration mechanism moves both the projection system and the light guide unit or at least the light guide unit along with the positioning member. In this case, the light guide unit forms a virtual image and the registration mechanism moves the light guide unit for the positional adjustment.

In yet another aspect of the invention, (a) the virtual image formation unit includes (a1) a signal light modulator that forms signal light modulated in accordance with an image, a scan system that scans the modulated signal light and outputs the modulated signal light as scanned light, and (a2) an irradiated member irradiated with the scanned light from the scan system to form a virtual image from the image light, and (b) the registration mechanism moves all the signal light modulator, the scan system, and the irradiated member or at least the irradiated member along with the positioning member. In this case, the irradiated member forms a virtual image and the registration mechanism moves the irradiated member for the positional adjustment.

In still yet another aspect of the invention, the positioning member is detachably provided in the predetermined position. In this case, at the time of virtual image observation after the positional adjustment, the positioning member can be removed not to prevent the observation.

In further another aspect of the invention, the wearer is allowed to recognize the wearer's eye and the positioning member via a mirror member disposed to face the wearer's eye on the opposite side of the positioning member to the wearer's eye in an optical axis direction. In this case, the mirror member can be used to readily and quickly make the positional adjustment.

In still further another aspect of the invention, the positioning member displays a physical marker that allows the wearer to recognize the standard position, and the virtual image formation unit forms a video image marker that displays the range of a displayed image recognized by the wearer as a virtual image formed from the image light in such a way that the wearer can compare the range with the physical marker. In this case, the wearer can readily and quickly make the positional adjustment by comparing the image displaying range indicated by the video image marker with the position of the physical marker that allows the wearer to recognize the standard position displayed by the positioning member.

In yet further another aspect of the invention, the registration mechanism has groove-shaped and protrusion-shaped positioning portions discretely arranged at fixed intervals in a direction in which the adjustment is made. In this case, the positional adjustment can be made more readily.

Instill yet further another aspect of the invention, the virtual image display apparatus further includes an information storage section that stores information on the adjusted position discretely determined by using the positioning portions of the registration mechanism and an information display section capable of displaying the information stored in the information storage section to allow the wearer to look at the displayed information. In this case, checking the stored adjusted position allows an optimum position for the wearer to be readily and quickly reproduced.

In a further aspect of the invention, the positioning member is attached in the predetermined position based on the standard position defined to be a position through which the optical axis of the optical system of the virtual image formation unit passes. In this case, achieving registration between the center of the eye and the standard position allows the apparatus to be adjusted in an optimum position.

A still further aspect of the invention is directed to a position adjustment method used with (a) a virtual image display apparatus including (a1) a virtual image formation unit that not only transmits environment light but also forms a virtual image from image light, (a2) a positioning member that is attached in a predetermined position corresponding to a standard position of an optical system of the virtual image formation unit, the positioning member displaying a marker that allows a wearer in an apparatus worn state in which the wearer is wearing the virtual image formation unit to recognize the standard position and hence works as an index for positioning, (a3) a registration mechanism that moves the optical system of the virtual image formation unit and the positioning member attached to the optical system to adjust the position of the virtual image formation unit relative to a wearer's eye, and (a4) an information storage section that stores information on an adjusted position provided in the adjustment made by the registration mechanism, the method including: (b) a standard position display step of displaying the standard position by using the positioning member to allow the wearer to recognize a discrepancy between the standard position and the position of the wearer's eye; and (c) an adjusted position storage step of storing information on the adjusted position provided in the adjustment made by the registration mechanism based on the standard position displayed in the standard position display step in the information storage section.

In the position adjustment method used with a virtual image display apparatus, since the standard position display step allows the wearer to recognize a discrepancy between the standard position and the position of the wearer's eye, providing a mechanism that allows the adjustment, for example, in the interpupillary distance direction readily allows registration according to person-to-person differences in interpupillary distance. Further, re-registration can be more readily and quickly achieved by storing information on an adjusted position in the information storage section.

BRIEF DESCRIPTION OF THE DRAWINGS

The invention will be described with reference to the accompanying drawings, wherein like numbers reference like elements.

FIG. 1A is a plan cross-sectional view of a body portion of a first display apparatus that forms a virtual image display apparatus, and FIG. 1B is a front view of the body portion.

DESCRIPTION OF EXEMPLARY EMBODIMENTS

Figure 2:
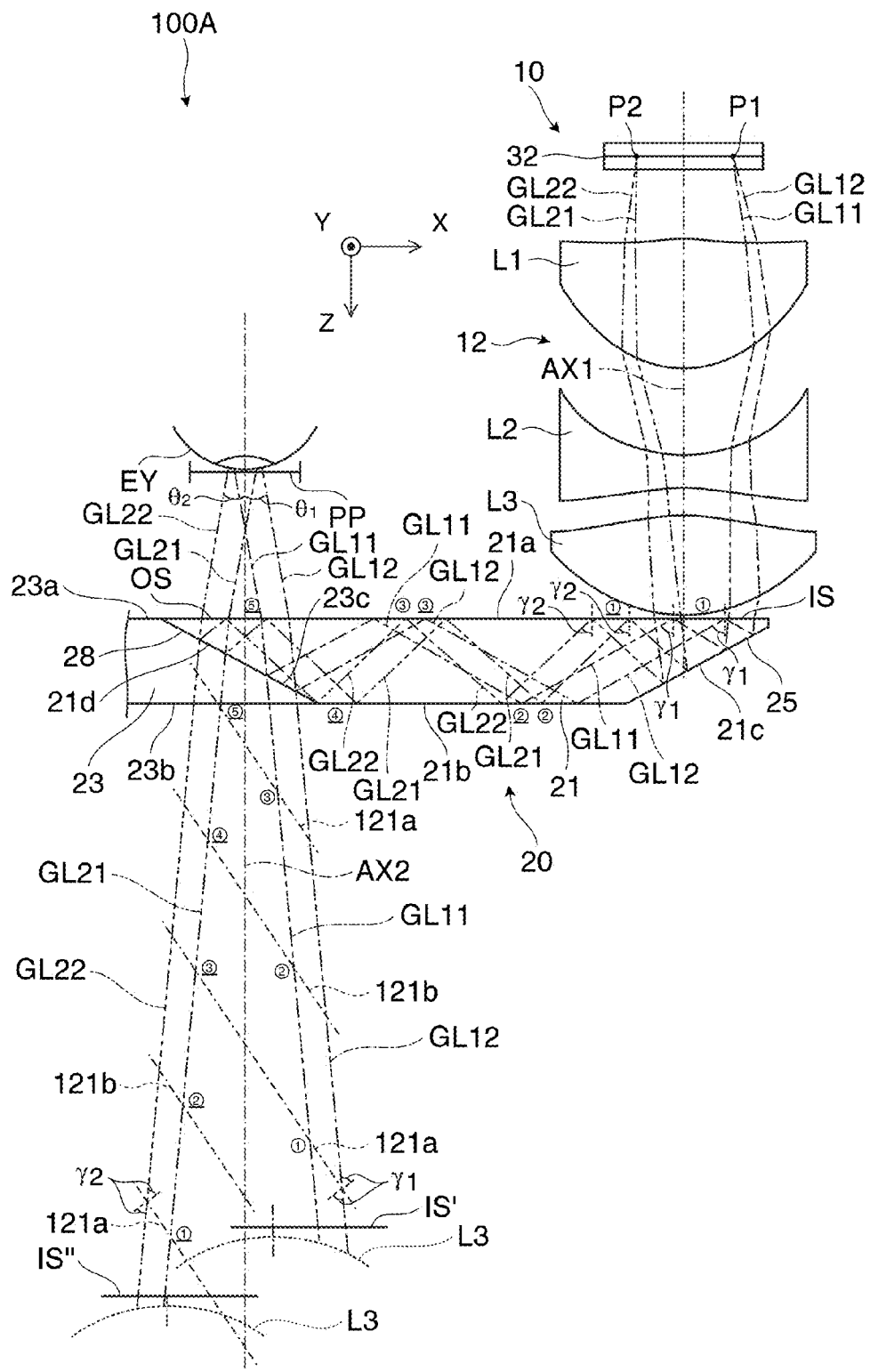
FIG. 2 is a plan view for specifically describing an example of the optical path of the optical system of the virtual image display apparatus.

A virtual image display apparatus according to an embodiment of the invention will be described below in detail with reference to the drawings.

A. Summary of Virtual Image Display Apparatus

A virtual image display apparatus 100 according to an embodiment shown in FIGS. 1A and 1B, which is a head-mounted display having a spectacle-like external appearance, allows a wearer, a viewer who is wearing the virtual image display apparatus 100, to not only recognize image light that forms a virtual image but also view an environment light image in see-through observation. The virtual image display apparatus 100 shown in FIG. 1A is only one-half the entire apparatus, and a first display apparatus 100A without a cover section or other portions shows the portion of the virtual image display apparatus 100 that forms a virtual image for the left eye.

In the state shown in FIGS. 1A and 1B, the direction oriented exactly frontward from the wearer is the direction along a second optical axis AX2, which is the light exiting-side optical axis of the optical system that forms the virtual image display apparatus 100. A +Z direction is defined to be the direction in which the second optical axis AX2 extends from the virtual image display apparatus 100 toward the wearer, ±Y directions are defined to be upward and downward directions along which the wearer's eyes are not aligned with each other, and ±X directions are defined to be rightward and leftward directions along which the wearer's eyes are aligned with each other.

B. Structure of Display Apparatus

An example of the structure of the first display apparatus 100A will be described below in order to describe an example of the structure of the virtual image display apparatus 100. The first display apparatus 100A includes an image formation unit 10, a light guide unit 20, a marker member MP1, which is a positioning member, and a registration mechanism 300. In the first display apparatus 100A, the image formation unit 10 and the light guide unit 20, which are substantially responsible for virtual image formation, are defined in the description to be a virtual image formation unit IP. In the first display apparatus 100A, although will be described later in detail with reference to FIG. 3A and other figures, the marker member MP1, which is a positioning member, and the registration mechanism 300 adjust the position of the virtual image formation unit IP relative to an eye EY to provide an accurate positional relationship between the wearer and the virtual image display apparatus 100, such as the one shown in FIG. 1A.

As background knowledge about description of the positional adjustment of the virtual image formation unit IP, the structures of the image formation unit 10 and the light guide unit 20, which form the virtual image formation unit IP, which is the portion that forms a virtual image, will be described below.

The image formation unit 10 includes an image display section 11 and a projection system 12. The image display section 11 includes an illuminator 31, which emits two-dimensional illumination light SL, and a liquid crystal display device 32, which is a transmissive spatial light modulator.

The illuminator 31 includes a light source 31a, which emits light containing red, green, and blue three color light components, and a backlight guide 31b, which diffuses the light from the light source 31a to form a light flux having a rectangular cross-sectional shape. The liquid crystal display device 32 spatially modulates the illumination light SL from the illuminator 31 to form color image light that forms motion images or any other images to be displayed.

The projection system 12 is a collimator lens that converts the image light having exited from each point on the liquid crystal display device 32 into a parallelized light flux.

The light guide unit 20 is a combination of a light guide member 21 and a light transmission member 23 bonded to each other and forms a flat-plate-shaped optical member extending as a whole in parallel to the XY plane.

In the light guide unit 20, the light guide member 21 is a trapezoidal-prism-shaped member in a plan view and has the following side surfaces: a first reflection surface 21a, a second reflection surface 21b, a third reflection surface 21c, and a fourth reflection surface 21d. The first reflection surface 21a and the second reflection surface 21b extend along the XY plane. The third reflection surface 21c is inclined to the XY plane by an acute angle α, which is smaller than or equal to 45°, and the fourth reflection surface 21d is inclined to the XY plane by an acute angle β, which is, for example, smaller than or equal to 45°. A first optical axis AX1, which is an optical axis passing through the third reflection surface 21c, that is, the light incident-side optical axis of the optical system, and the second optical axis AX2, which is an optical axis passing through the fourth reflection surface 21d, that is, the light exiting-side optical axis of the optical system, are disposed in parallel to each other.

The light guide member 21 is made of a resin material having high light transmittance in the visible region. The light guide member 21 is formed of a body portion 20a, which is a block-shaped member integrally molded in an injection molding process. The light guide member 21, which is formed of the body portion 20a that serves as a base and is an integrally formed part as described above, can be functionally divided into a light incident portion B1, a light guide portion B2, and a light exiting portion B3.

The light incident portion B1 is a triangular-prism-shaped portion and has a light incident surface IS, which is part of the first reflection surface 21a, and the third reflection surface 21c, which faces the light incident surface IS. The light incident surface IS is a flat surface that is disposed on the rear side or the wearer side and introduces image light GL from the image formation unit 10, faces the projection system 12, and extends in the direction perpendicular to the first optical axis AX1 of the projection system 12. The third reflection surface 21c has a rectangular contour and has a mirror layer 25 formed on the entire rectangular area, and the mirror layer 25 is a total reflection mirror that reflects the image light GL having passed through the light incident surface IS and guides the reflected light into the light guide portion B2. The mirror layer 25 is formed in a film formation process of depositing aluminum or any other suitable material on an inclined surface RS of the body portion 20a of the light guide member 21. The third reflection surface 21c is inclined to the first optical axis AX1 of the projection system 12 or the XY plane, for example, by an acute angle α ranging from 25° to 27° and deflects the image light GL incident through the light incident surface IS and traveling as a whole in the +Z direction in such a way that the deflected image light GL travels as a whole in the −X direction but inclined toward the −Z direction, whereby the image light GL is reliably introduced into the light guide portion B2.

The light guide portion B2 has the following two flat surfaces facing each other and extending in parallel to the XY plane: the first reflection surface 21a and the second reflection surface 21b, each of which totally reflects the image light deflected off the light incident portion B1. It is assumed in the description that the first reflection surface 21a is located on the rear side or the wearer side close to the image formation unit 10, and the second reflection surface 21b is located on the front side or the environment side far away from the image formation unit 10. In this case, the first reflection surface 21a is a surface portion common to the light incident surface IS, which has been described above, and a light exiting surface OS, which will be described later. Each of the first reflection surface 21a and the second reflection surface 21b is a total reflection surface based on a refractive index difference.

The image light GL reflected off the third reflection surface 21c of the light incident portion B1 is first incident on and totally reflected off the first reflection surface 21a. The image light GL is then incident on and totally reflected off the second reflection surface 21b. The image light, which repeatedly undergoes the action described above, is guided as a whole in a primary light guiding direction on the far side of the light guide unit 20, that is, toward the −X side where the light exiting portion B3 is disposed. Neither the first reflection surface 21a nor the second reflection surface 21b has reflection coating provided thereon, and environment light or external light incident from the environment on the second reflection surface 21b therefore passes through the light guide portion B2 at high transmittance. That is, the light guide portion B2 is a see-through-type portion that allows see-through observation of an environment light image.

The light exiting portion B3 is a triangular-prism-shaped portion and has a light exiting surface OS, which is part of the first reflection surface 21a, and the fourth reflection surface 21d, which faces the light exiting surface OS. The light exiting surface OS is a rear-side flat surface through which the image light GL exits toward the wearer's eye EY, is part of the first reflection surface 21a as the light incident surface IS is, and extends in the direction perpendicular to the second optical axis AX2. The fourth reflection surface 21d is a rectangular flat surface and has a half-silvered mirror layer 28 in a rectangular area defined in a central portion of the fourth reflection surface 21d. The half-silvered mirror layer 28 not only reflects the image light GL incident thereon via the first reflection surface 21a and the second reflection surface 21b so that the image light GL exits out of the light exiting portion B3 but also transmits environment light OL. The half-silvered mirror layer 28 is a semitransparent reflection film that partially transmits light. The half-silvered mirror layer 28 is formed in a film formation process of forming a metal reflection film or a dielectric multilayer film made, for example, of silver on an inclined surface RR, which forms the fourth reflection surface 21d of the light guide member 21. The reflectance of the half-silvered mirror layer 28 that reflects the image light GL is set at a value greater than or equal to 10% but smaller than or equal to 50% provided that the image light GL is incident at an angle of incidence within an expected range and in consideration of facilitating see-through observation of the environment light OL.

The fourth reflection surface 21d, which is inclined to the second optical axis AX2 perpendicular to the first reflection surface 21a or the XY plane, for example, by the acute angle α ranging from 25° to 27°, partially reflects the image light GL incident thereon via the first reflection surface 21a and the second reflection surface 21b of the light guide portion B2 and directs the reflected light as a whole in the −Z direction. The image light GL thus passes through the light exiting surface OS.

Now, among the points on the fourth reflection surface 21d, the point through which the second optical axis AX2 passes is called a standard position (reference position) SP, which is used in registration of the optical system of the virtual image formation unit IP. In this case, the standard position SP, which is a reference position, is a point not only indicating the center of the fourth reflection surface 21d, that is, the center of the half-silvered mirror layer 28 but also indicating a light exiting-side standard position in the overall optical system including the light guide unit 20. An accurate positional relationship, such as the one shown in FIG. 1A, is achieved by adjusting the position of the virtual image formation unit IP relative to the eye EY based on the standard position SP.

The light transmission member 23 is formed of a body portion 23s having the same refractive index as that of the body portion 20a of the light guide member 21 and has a first surface 23a, a second surface 23b, and a third surface 23c. The first surface 23a and the second surface 23b extend along the XY plane as the first reflection surface 21a and the second reflection surface 21b do. The third surface 23c is so disposed that the third surface 23c is inclined to the XY plane and faces the fourth reflection surface 21d of the light guide member 21 in parallel thereto. That is, the light transmission member 23 is a wedge-shaped member sandwiched between the second surface 23b and the third surface 23c. The light transmission member 23 is made of a resin material having high light transmittance in the visible region, as the light guide member 21 is. The body portion 23s of the light transmission member 23 is a block-shaped member integrally molded in an injection molding process.

In the light transmission member 23, the first surface 23a is disposed in an extension flat plane of the first reflection surface 21a of the light guide member 21 and located on the rear side close to the wearer's eye EY, and the second surface 23b is disposed in an extension flat plane of the second reflection surface 21b of the light guide member 21 and located on the front side far away from the wearer's eye EY. The third surface 23c is a rectangular light transmissive surface bonded to the fourth reflection surface 21d of the light guide member 21 with an adhesive. The angle between the first surface 23a and the third surface 23c described above is equal to an angle ∈ between the second reflection surface 21b and the fourth reflection surface 21d of the light guide member 21, and the angle between the second surface 23b and the third surface 23c is equal to the angle β between the first reflection surface 21a and the fourth reflection surface 21d of the light guide member 21.

The light transmission member 23 and the light guide member 21 are bonded to each other to form a see-through portion B4 formed of the bonded portion and a portion in the vicinity thereof. That is, neither the first surface 23a nor the second surface 23b has reflection coating, such as a mirror layer, provided thereon, and the environment light OL therefore passes through the first surface 23a and the second surface 23b at high transmittance, as the environment light OL passes through the light guide portion B2 of the light guide member 21 does. The third surface 23c can also transmit the environment light OL at high transmittance, but the fourth reflection surface 21d of the light guide member 21 has the half-silvered mirror layer 28, and the environment light OL passing through a central area of the third surface 23c is therefore attenuated. That is, the wearer views the attenuated image light GL and environment light OL superimposed on each other.

The virtual image display apparatus 100, specifically, the thus configured virtual image formation unit IP formed of the image formation unit 10 and the light guide unit 20, forms a virtual image from the image light GL. Further, since the light guide unit 20 has a see-through configuration that allows transmission of the environment light OL as described above, the virtual image display apparatus 100 allows the wearer to view an environment light image as well as the virtual image.

An exemplary specific optical path of the image light in the first display apparatus 100A will be described below with reference to FIG. 2. FIG. 2 shows only an optical system involved in determination of the optical path of the image light, and the marker member MP1 and other components are omitted. Further, the projection system 12 is assumed to include three lenses L1, L2, and L3.

As shown in FIG. 2, image light GL11 and image light GL12 from a first display point P1 in a right portion of the liquid crystal display device 32 are totally reflected off the first reflection surface 21a and the second reflection surface 21b always at a first angle of reflection γ1 three times in total and incident on the fourth reflection surface 21d. The image light GL11 and the image light GL12 are reflected off the fourth reflection surface 21d at the same angle of reflection as the angle of reflection at which they are reflected off the third reflection surface 21c and exits through the light exiting surface OS as parallelized light fluxes inclined by an angle $\theta_1$ to the second optical axis AX2, which is perpendicular to the light exiting surface OS.

Image light GL21 and image light GL22 from a second display point P2 in a left portion of the liquid crystal display device 32 are totally reflected off the first reflection surface 21a and the second reflection surface 21b always at a second angle of reflection γ2 five times in total and incident on the fourth reflection surface 21d. The image light GL21 and the image light GL22 are reflected off the fourth reflection surface 21d at the same angle of reflection as the angle of reflection at which they are reflected off the third reflection surface 21c and exits through the light exiting surface OS as parallelized light fluxes inclined by an angle $\theta_2$ to the second optical axis AX2, which is perpendicular to the light exiting surface OS.

Further, the development of the light guide member 21 in FIG. 2 shows that the wearer views the lens L3 of the projection system 12 present in the vicinity of a light incident equivalent plane IS' and the lens L3 present in the vicinity of a light incident equivalent plane IS" overlapping with each other, the two light incident equivalent planes corresponding to the light incident surface IS but located in different positions.

When the image light fluxes GL11 to GL22 having exited as parallelized light fluxes as described above allow the wearer to recognize a virtual image, the image light fluxes GL11 to GL22 are maintained as parallelized light fluxes but differently inclined in accordance with the positions thereof and gathered in a pupil position PP. The wearer whose eye EY is located in the pupil position PP recognizes the position of the virtual image based on the angle of each of the exiting image light fluxes GL11 to GL22. In this case, if each of the parallelized light fluxes has a large light flux width, the range over which the wearer's eye EY can accept light widens, and the image is recognized with no dark portion or truncated portion in the periphery even when an actual arrangement of the apparatus is shifted from an ideal arrangement of the apparatus, such as the one shown in FIG. 1A, or even when the eye EY is shifted from the second optical axis AX2 to some extent in the pupil position PP and therearound. To increase the light flux width, however, the overall optical system needs to be enlarged, for example.

To allow the wearer to reliably recognize a virtual image with no increase in the light flux width, it is very important in the observation using the virtual image display apparatus 100 that the virtual image display apparatus 100 is correctly positioned relative to the eye EY, specifically, that the positional adjustment is so made that the wearer's eye EY is located along the second optical axis AX2 in the pupil position PP, where the light fluxes are gathered. It is assumed in the present embodiment that the positional adjustment is made in a direction parallel to a reference plane SF, which is a flat plane perpendicular to the optical axes AX1 and AX2, that is, in the X and Y directions. In the positional adjustment in the X and Y directions, the marker member MP1, which is a positioning member, and the registration mechanism 300 allow the wearer to readily and reliably achieve registration of the apparatus by taking advantage of the see-through configuration. Since adjustment in the direction along the optical axes AX1 and AX2, that is, adjustment in the Z direction can be made as appropriate when or after the user wears the apparatus, it is assumed in the description that the eye EY has undergone positional adjustment in the Z direction, in which the optical axis AX2 extends, in an apparatus worn state in which the virtual image display apparatus 100 is worn, and has been located in the pupil position PP or therearound.

C. Registration Mechanism

To describe the positional adjustment of the virtual image formation unit IP, the structures and other features of the marker member MP1 and the registration mechanism 300 will be described.

Referring back to FIGS. 1A and 1B, the marker member MP1 is a thin-plate-shaped or sheet-shaped transparent member, and a cross-hair marker CR is drawn as a physical marker on the marker member MP1. The marker member MP1 is attached to the light guide unit 20 with respect to a point XX where the lines of the marker CR intersect each other as a reference point according to which the attachment position is determined, and the marker member MP1 securely affixed onto an optically unused portion of the second reflection surface 21b and the second surface 23b, which is an extension of the second reflection surface 21b. It is assumed in the description that the marker member MP1 has a rectangular plate-like or sheet-like shape and the four corners thereof are affixed to the second reflection surface 21b and the second surface 23b, by way of example. The point XX on the marker member MP1 is located in a position along the second optical axis AX2, which is the optical axis along which the image light GL exits, as shown in FIG. 1A. That is, in the marker member MP1, the point XX is a reference point corresponding to the standard point SP of the overall optical system of the virtual image formation unit IP including the light guide unit 20. The wearer who uses the virtual image display apparatus 100 can therefore view a virtual image in a correct position corresponding to the standard position SP, such as the position of the eye EY shown in FIG. 1A, by achieving registration between the center of the wearer's eye EY and the point XX. That is, the marker member MP1, which has the marker CR, which serves as an index in the positional adjustment of the virtual image formation unit IP, functions as a positioning member. The marker member MP1 can be attached to and detached from the light guide unit 20 and can be removed therefrom after the positional adjustment.

Figure 3A:
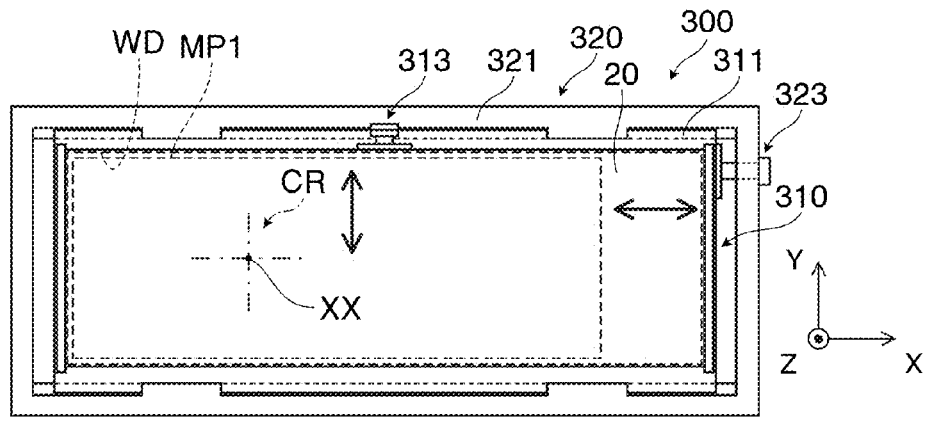
FIG. 3A is a front view showing a registration mechanism.

Positional adjustment or registration of the wearer relative to the optical system of the virtual image formation unit IP is made by using the registration mechanism 300 having the structure shown in FIG. 3A and other figures.

An example of the structure of the registration mechanism 300 will be specifically described below. The registration mechanism 300 is a member that allows the positional adjustment of the virtual image formation unit IP relative to the eye EY by moving the virtual image formation unit IP including the light guide unit 20 in a plane parallel to the reference plane SF, which is a flat plane perpendicular to the optical axes AX1 and AX2, that is, in the X and Y directions. That is, it can be said that the registration mechanism 300 is a positional adjustment mechanism as well as a registration mechanism for the virtual image formation unit IP. In the virtual image display apparatus 100, a direction parallel to the reference plane SF (X and Y directions) is a direction along which the apparatus is translated with no influence on image formation. That is, moving the virtual image formation unit IP by using the registration mechanism 300 may cause light attenuation but does not basically change the state of the image formation including the position and size of an image. In the positional adjustment, in which a variety of optical systems as a whole including the light guide unit 20, which is a key component for forming a virtual image, such as the virtual image formation unit IP, are integrally moved, it is assumed in the example shown in FIGS. 3A to 3D to simplify the description that the virtual image formation unit IP including the light guide unit 20 is a united part and the entire optical system of the virtual image formation unit IP is moved as the registration mechanism 300 moves the light guide unit 20. It is further assumed in FIGS. 3A to 3D and other figures to simplify the description that the light guide unit 20 has a box-like exterior shape.

First of all, the registration mechanism 300 includes an upward/downward adjustment mechanism 310 for adjusting the position of the optical system, for example, of the light guide unit 20 to which the marker member MP1 is attached in the upward and downward directions (Y direction), which corresponds to the vertical direction, and a rightward/leftward adjustment mechanism 320 for positional adjustment in the rightward and leftward directions (X direction), which correspond to the horizontal direction, as shown in FIGS. 3A to 3D.

Figure 3B:
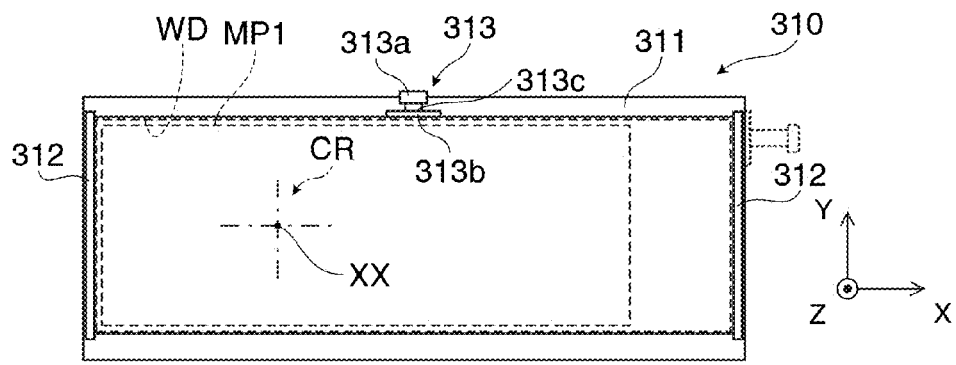
FIG. 3B is a front view showing an upward/downward registration mechanism.
Figure 3C:
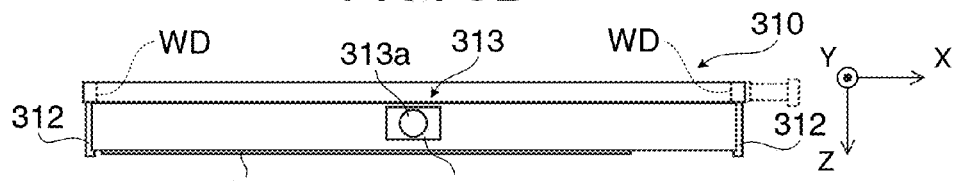
FIG. 3C is a plan view showing the upward/downward registration mechanism.

The upward/downward adjustment mechanism 310 includes an inner frame 311, a pair of upward/downward guides 312, and a screw mechanism 313, as shown in FIGS. 3A, 3B, and 3C. The inner frame 311 is a frame-shaped member having a window WD having substantially the same size as that of the light guide unit 20 and so disposed that the inner frame 311 surrounds the light guide unit 20. The pair of the upward/downward guides 312 are so disposed on the right and left end sides of the inner frame 311 that they extend along the side portions of the light guide unit 20 in the Y direction, in which the upward/downward adjustment mechanism 310 makes adjustment, and the pair of the upward/downward guides 312 sandwich the light guide unit 20. The screw mechanism 313 includes a screw head 313a to be rotated with a screwdriver or any other tool (not shown) inserted from above (from +Y side), a link 313b that is securely attached to the light guide unit 20 and causes the light guide unit 20 to slide in the ±Y directions in response to pushing or pulling motion resulting from the rotation of the screw head 313a, and a shaft 313c that extends in the Y direction and transmits the action of the screw head 313a to the link 313b. The wearer can use the screw mechanism 313 to adjust the light guide unit 20 in the upward and downward directions (±Y directions).

Figure 3D:
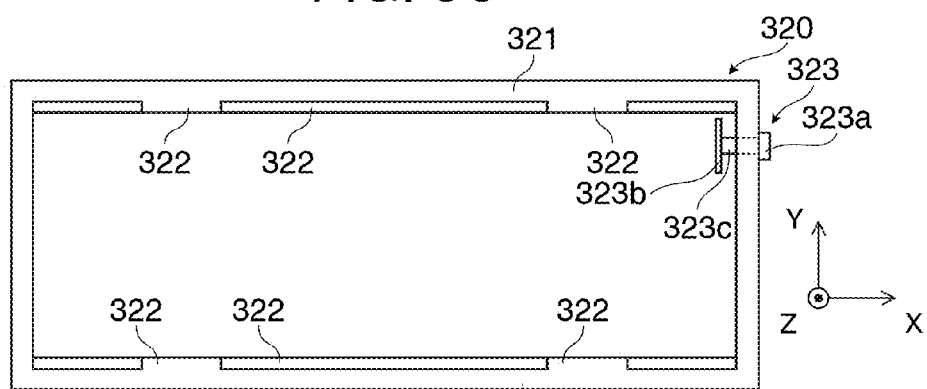
FIG. 3D is a front view showing a rightward/leftward registration mechanism.

The rightward/leftward adjustment mechanism 320 includes an outer frame 321, a pair of rightward/leftward guides 322, and a screw mechanism 323, as shown in FIGS. 3A and 3D. The outer frame 321 is a frame-shaped member and so disposed that the outer frame 321 surrounds the inner frame 311. The pair of the rightward/leftward guides 322 are so disposed on the upper and lower inner end sides of the outer frame 321 that they extend along the side portions of the inner frame 311 in the X direction, in which the rightward/leftward adjustment mechanism 320 makes adjustment. The screw mechanism 323 includes a screw head 323a to be rotated with a screwdriver or any other tool (not shown) inserted from the right (from +X side), a link 323b that is securely attached to the inner frame 311 and causes the inner frame 311 to slide in the ±X directions in response to pushing or pulling motion resulting from the rotation of the screw head 323a, and a shaft 323c that extends in the X direction and transmits the action of the screw head 323a to the link 323b. The wearer can use the screw mechanism 323 to adjust the light guide unit 20 in the rightward and leftward directions (±X directions), that is, in the interpupillary distance direction.

An example of the positional adjustment using the marker member MP1 and the registration mechanism 300 will be described below with reference to FIG. 4A and other figures. It is assumed that the wearer makes the adjustment while looking at the apparatus worn state, in which the wearer is wearing the virtual image display apparatus 100, displayed on a mirror by taking advantage of the fact that the virtual image display apparatus 100 is a see-through-type apparatus.

Figure 4A:
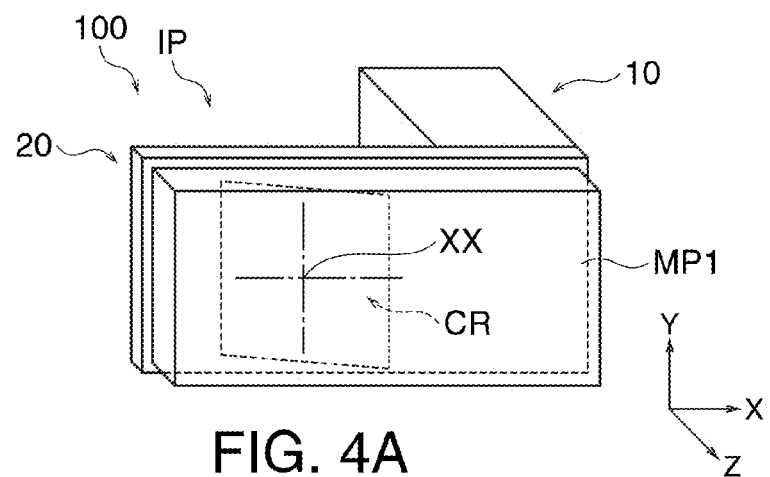
FIG. 4A is a diagrammatic view showing an optical system including a light guide unit to which a positioning member is attached.
Figure 4B:
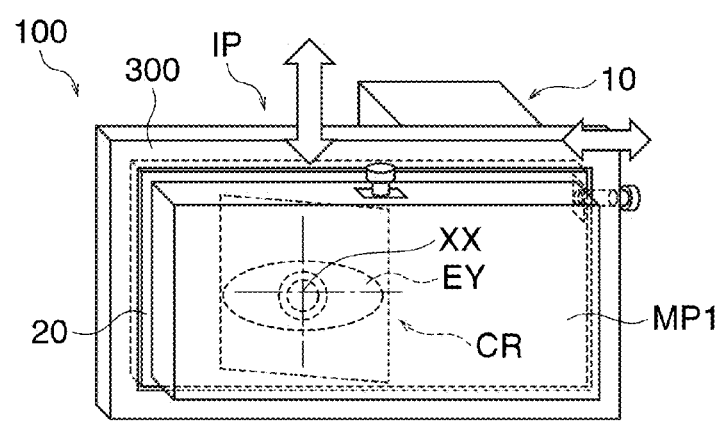
FIG. 4B is a diagrammatic view showing how adjustment is made by using the registration mechanism.
Figure 4C:
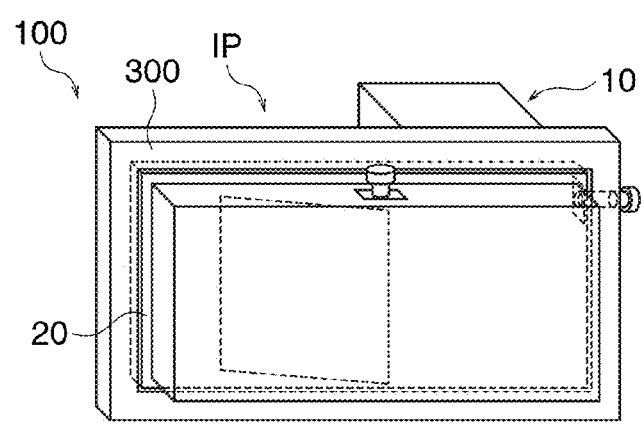
FIG. 4C is a diagrammatic view showing a state after the adjustment.

First of all, before the positional adjustment, the marker member MP1 is attached to the virtual image formation unit IP, which is the integrated optical system including the pre-positional-adjustment image formation unit 10, light guide unit 20, and other components, specifically, to the light guide unit 20, as shown in FIG. 4A. Further, the virtual image display apparatus 100 includes the registration mechanism 300 described with reference to FIG. 3A and other figures, and the registration mechanism 300 can move the virtual image formation unit IP along with the marker member MP1 in the X and Y directions, as shown in FIG. 4B. The wearer, who is wearing the virtual image display apparatus 100, checks, for example, the position of the wearer's eye EY based, for example, on an environment light image containing the wearer displayed on a mirror and uses the registration mechanism 300 to move the virtual image formation unit IP for the positional adjustment. Finally, after the positional adjustment, the wearer removes the marker member MP1 and activates the virtual image display apparatus 100 to display a virtual image for image observation, as shown in FIG. 4C. At the time of image light observation, the marker CR or other components will not block the wearer's sight because the marker member MP1 has been already removed.

Figure 5:
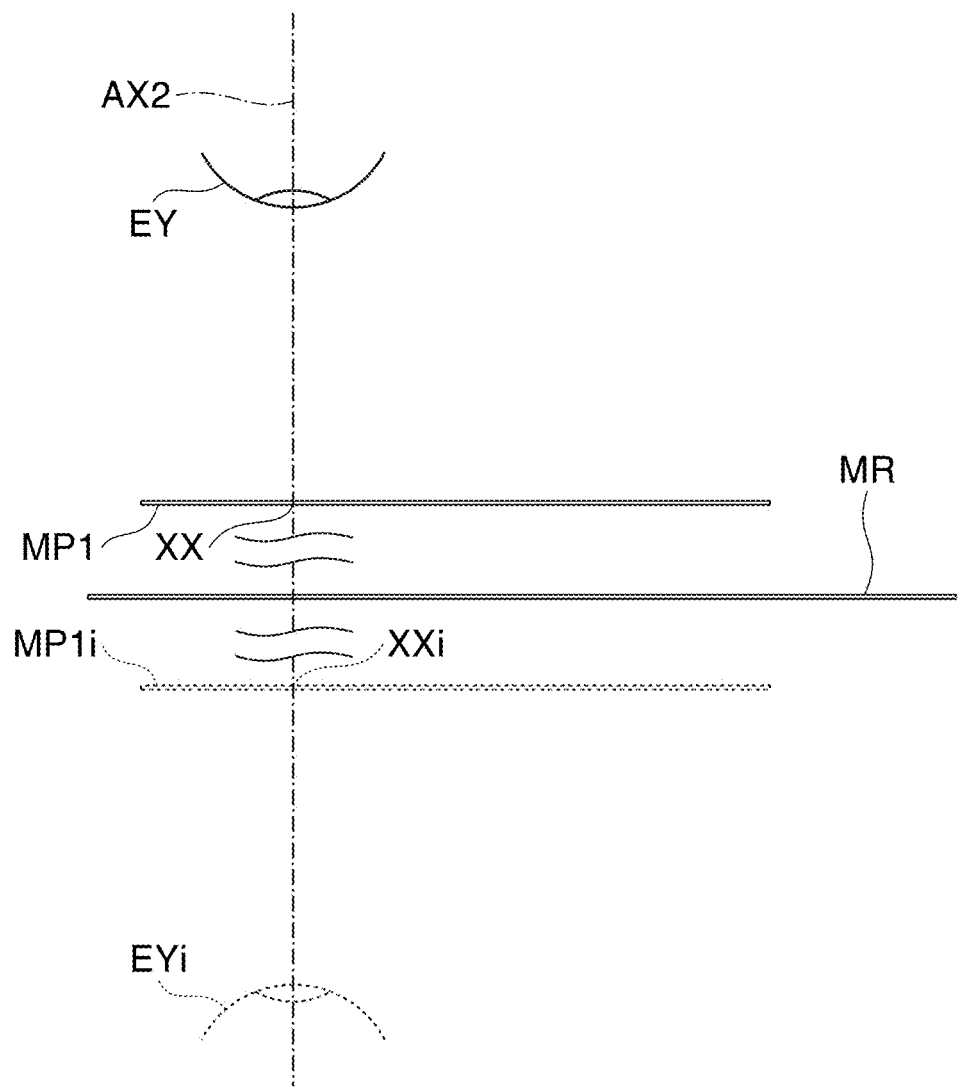
FIG. 5 shows the positional relationship between a wearer's eye and the positioning member in mirror-based positional adjustment.

FIG. 5 diagrammatically shows the positional relationship in a case where the wearer uses a mirror (mirror member MR) to display the apparatus worn state of the wearer shown in FIG. 4B. In FIG. 5, an eye EYi and a point XXi of a marker member MP1i drawn with the broken lines represent virtual images of the wearer's eye EY and the point XX displayed on the mirror member MR. In the positional adjustment, the wearer uses the registration mechanism 300 shown in FIG. 3A and other figures to move the virtual image formation unit IP in such a way that the virtual images of the center of the eye EYi and the point XX displayed on the mirror member MR are aligned with the center of the wearer's eye EY and the point XX along an extension of the second optical axis AX2. In general, when the wearer attempts to directly view the marker CR located in the immediate vicinity of the wearer as shown in FIG. 1B and other figures without using the mirror member MR, the wearer cannot bring the marker CR into focus but views a blurred marker CR. In contrast, a virtual image of the marker CR displayed on the mirror member MR can be recognized with no blur, whereby the adjustment using a mirror allows the registration described above to be readily achieved.

As described above, in the present embodiment, the wearer can make positional adjustment of the virtual image display apparatus 100 relative to the position of the wearer's eye EY by using the registration mechanism 300 while checking the marker member MP1, which is a positioning member, whereby an optimum adjusted position is readily achieved. In particular, in the virtual image display apparatus 100, the first display apparatus 100A, which is the virtual image formation unit, not only transmits the environment light OL but also forms a virtual image from the image light GL. That is, the virtual image display apparatus 100, which is a see-through-type apparatus that superimposes the image light GL and the environment light OL on each other, allows the wearer to recognize the standard position SP, for example, with the aid of the point XX indicated by the marker CR of the marker member MP1 illuminated with the environment light OL. Specifically, for example, the position of the virtual image display apparatus 100 can be readily so adjusted that the position thereof is optimum for the eye EY of the wearer who is wearing the virtual image display apparatus by operating the registration mechanism 300 to achieve registration between the position of the wearer's eye EY and the point XX indicated by the marker member MP1 while displaying the wearer on a mirror, that is, taking advantage of the fact that the apparatus is a see-through-type apparatus to check the wearer illuminated with the environment light OL. Further, in this case, registration according to person-to-person differences in the interpupillary distance can be readily achieved, whereby it is not necessary, for example, in the optical design of the image formation unit 10, the light guide unit 20, and other components, to increase the light flux width of the image light GL or provide the image light GL with a margin, preventing the size of the virtual image display apparatus 100 from increasing.

Figure 6:
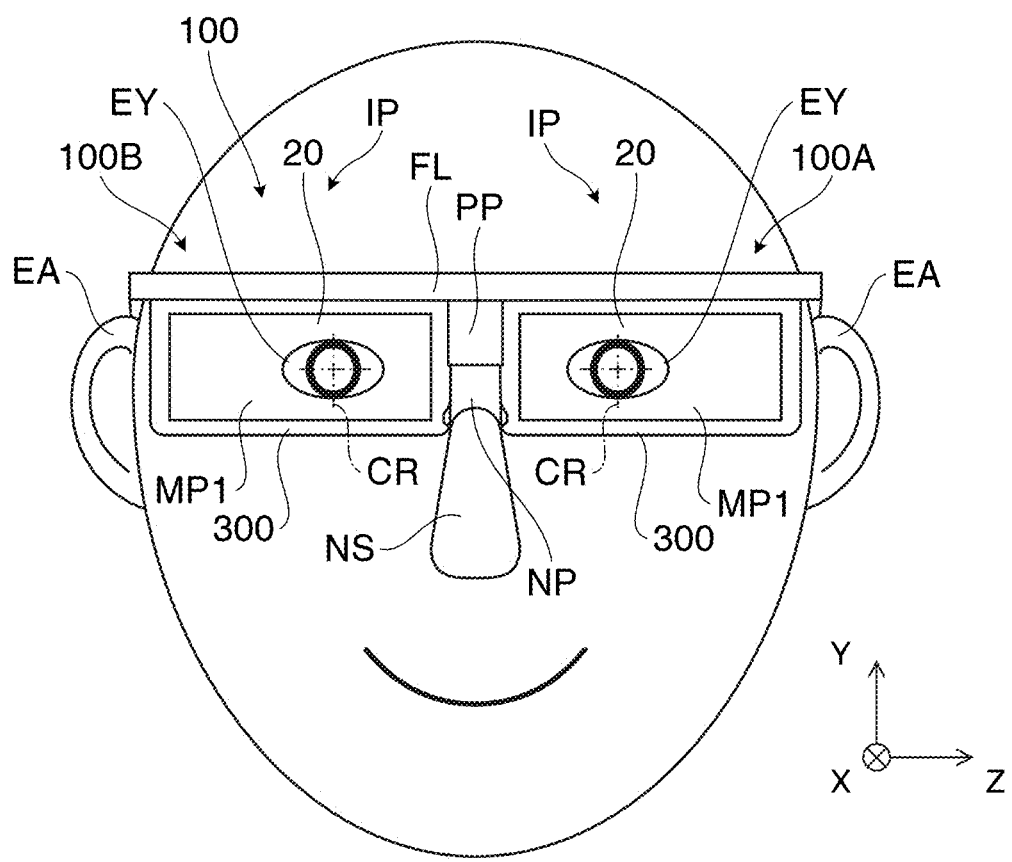
FIG. 6 is a front view diagrammatically showing the virtual image display apparatus worn by the wearer.

FIG. 6 is a front view diagrammatically showing the thus configured virtual image display apparatus 100 worn by the wearer. In the example shown in FIG. 6, in the first display apparatus 100A for the left eye and a second display apparatus 100B for the right eye, the registration mechanism 300 disposed in each of the left and right display apparatus is supported sideways by a column PP extending from a central portion of a frame FL. Further, the virtual image display apparatus 100 includes a nose pad NP disposed at the front end of the column PP and allowing the nose NS to support the virtual image display apparatus 100 during the period when the wearer is wearing the virtual image display apparatus 100.

Figure 7A:
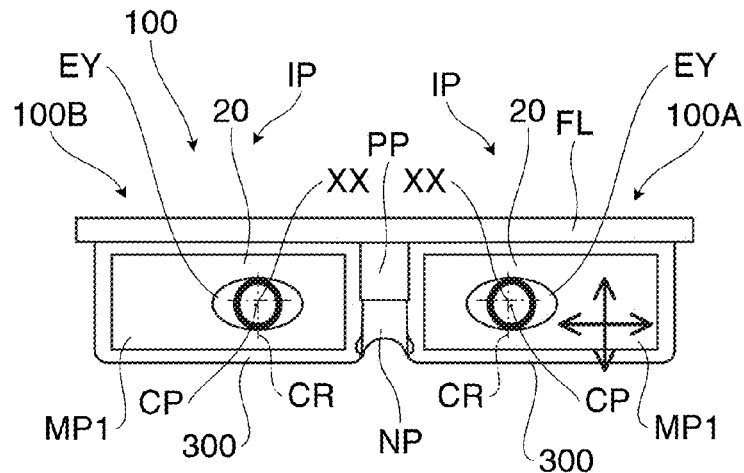
FIG. 7A shows the positional adjustment for the left eye.
Figure 7B:
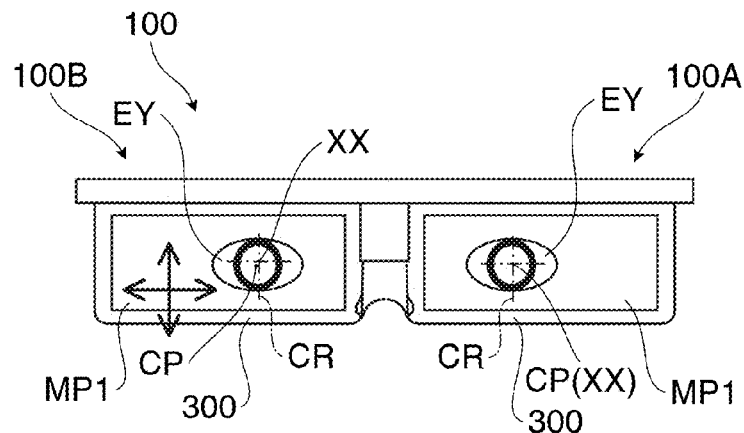
FIG. 7B shows the positional adjustment for the right eye.
Figure 7C:
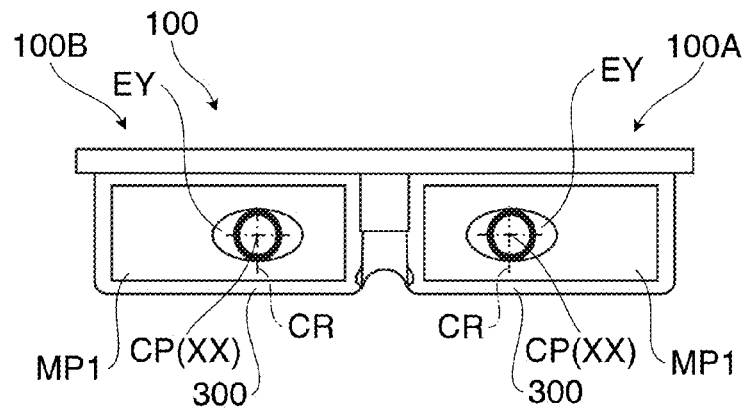
FIG. 7C shows a state in which the positional adjustment for both the eyes have been completed.

The position of the virtual image display apparatus 100 can be adjusted relative to each of the left and right eyes EY, as shown in FIGS. 7A to 7C. As a specific example, first in the first display apparatus 100A for the left eye, the regis-tration mechanism 300 for the left eye is used to achieve registration between the point XX of the marker CR, which works as an index of the standard position, and the center CP of the eye EY via a mirror as shown in FIG. 7A in such a way that the point XX and the center CP coincide with each other as shown in FIG. 7B. Similarly in the second display apparatus 100B for the right eye, the registration mechanism 300 for the right eye is used to achieve registration between the point XX of the marker CR and the center CP of the eye EY in such a way that the point XX and the center CP coincide with each other as shown in FIG. 7C or FIG. 6. Both the eyes can thus be in registration with the virtual image display apparatus 100.

In the above description, in which the entire first display apparatus 100A forms the virtual image formation unit IP, it can be said that a portion of the first display apparatus 100A, instead of the entire first display apparatus 100A, is the virtual image formation unit as long as the portion includes part of the optical system that forms the first display apparatus 100A, specifically, at least the light guide unit 20, which is an optical system that not only transmits environment light but also forms a virtual image from image light. For example, the projection system 12 and the light guide unit 20, which are key components that form a virtual image in the image formation unit 10, may be defined to form the virtual image formation unit IP.

Further, in the above description, the configuration of the marker member MP1 is presented by way of example, and a variety of other aspects are conceivable as well as the configuration described above. For example, the marker CR does not necessarily have the cross-hair shape but may alternatively have a variety of other shapes, and the point XX corresponding to the standard position SP may indicate a position off the optical axis as long as accurate positional adjustment can be made.

Further, in the above description, the marker member MP1 is a rectangular thin-plate-shaped or film-shaped member, and the four corners thereof are securely affixed to the light guide unit 20, but the marker member MP1 may have any other shape. Moreover, the size of the marker member MP1 may be any other size, that is, larger or smaller than the size described above as long as the marker CR can be provided on the marker member MP1. The marker member MP1 is not necessarily affixed but may be otherwise fixed.

Further, for example, the marker CR may be illuminated with light from a lamp that goes on and off by turning on and off a power supply.

Further, in the above description, the light guide unit 20 has a box-like exterior shape, but a light guide unit 20 having a polyhedral exterior shape, such as the one shown in FIG. 1A, can operate as described above, for example, by changing the shape and other factors of the pair of upward/downward guides 312 as appropriate.

Further, in the above description, it is assumed that adjustment has been made in the Z direction, in which the optical axis AX2 extends. Alternatively, for example, the registration mechanism 300 may achieve registration in the Z direction as well as in the X and Y directions.

Second Embodiment

A virtual image display apparatus according to a second embodiment will be described below. The virtual image display apparatus according to the present embodiment is a variation of the virtual image display apparatus 100 according to the first embodiment and has the same exterior structure as that of the virtual image display apparatus 100 except the configuration of the marker member. Therefore, only the marker member and peripherals thereof are illustrated, and illustration and description of the entire apparatus will be omitted.

Figure 8A:
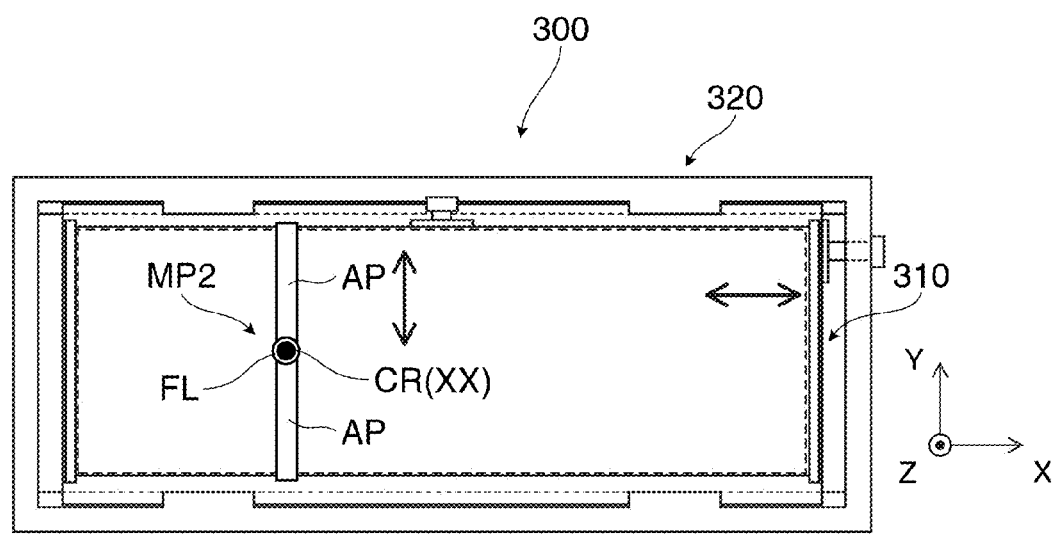
FIG. 8A is a front view showing a registration mechanism of a virtual image display apparatus according to a second embodiment.
Figure 8B:
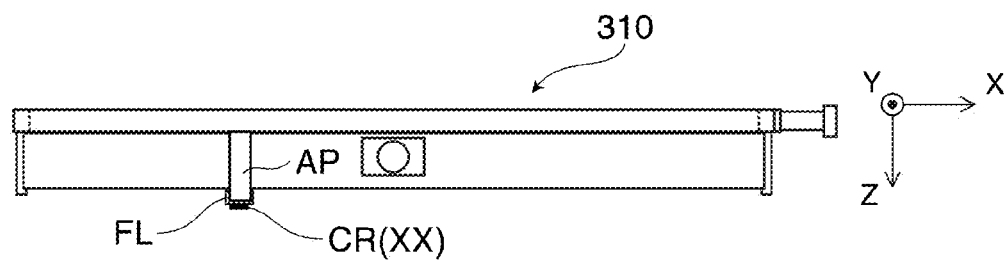
FIG. 8B is a plan view for describing the structure of a positioning member.

FIGS. 8A and 8B correspond to FIGS. 3A and 3C in the first embodiment and describe the structure of a marker member MP2 in the virtual image display apparatus according to the present embodiment. In FIGS. 8A and 8B, the registration mechanism 300 is the same as that shown in FIG. 3A and other figures, and no description thereof will therefore be made.

The marker member MP2 includes a lens portion FL and an attachment portion AP. The lens portion FL of the marker member MP2 is formed, for example, of a Fresnel lens. Further, the lens portion FL has a marker CR provided thereon on the side facing away from the wearer, that is, on the +Z side, and the marker CR is a point XX indicating a reference point for the positional adjustment. The marker CR is a physical marker formed, for example, by affixing a physical object on a lens surface of the lens portion FL. The attachment portion AP is a pair of members that extend from the upper and lower ends of the lens portion FL in the upward and downward directions, that is, in the Y direction in FIGS. 7A and 7B and support the lens portion FL, and the attachment portion AP can be attached to and detached from the light guide unit 20. That is, the marker member MP2 can be attached to and detached from the light guide unit 20 via the attachment portion AP.

The marker member MP2, which allows the wearer to view the marker CR provided on the +Z side, that is, on the side facing away from the wearer through the Fresnel lens, allows the wearer to recognize the marker CR without blur even when the marker CR is in the immediate vicinity of the wearer. The marker member MP2, which shows the wearer who is wearing the apparatus that the position of the recognized marker CR is the point XX indicating the standard point SP of the optical system, allows the wearer to recognize the position thereof. That is, the wearer can make the positional adjustment based on the point XX provided on the lens portion FL. As described above, in the present embodiment, the wearer can directly, without using a mirror or any other tool, visually recognize the point XX indicated by the marker CR and located in the immediate vicinity of the wearer, as in the case of the marker CR in the first embodiment shown in FIG. 1B and other figures. That is, the positional adjustment can be made with no mirror or any other tool. It is noted in the present embodiment that the positional adjustment can also be made by using a mirror as in the first embodiment.

Figure 9A:
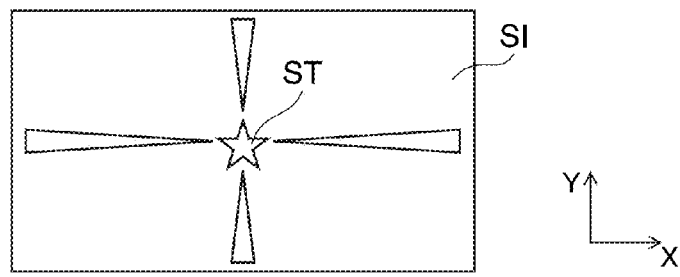
FIG. 9A shows a video image marker displayed as a virtual image.
Figure 9B:
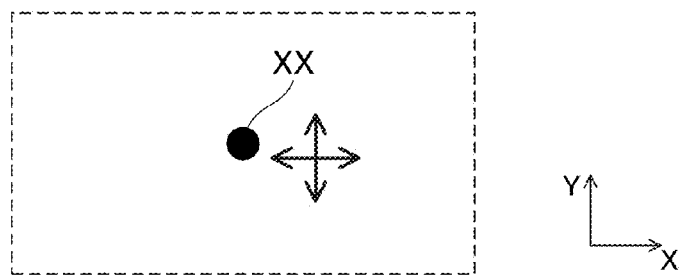
FIG. 9B shows the position of a marker produced by a positioning member.
Figure 9C:
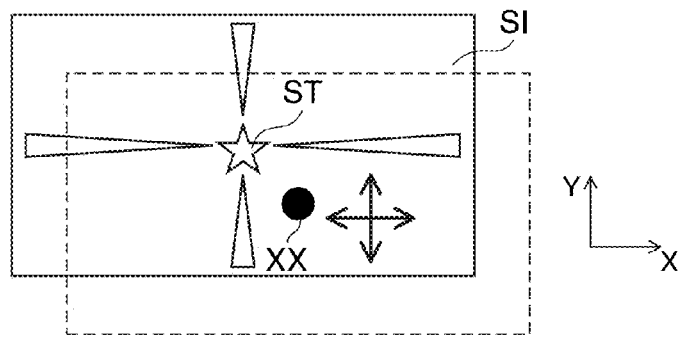
FIG. 9C shows a case where a recognized position of the marker deviates from the center of the video image marker.
Figure 9D:
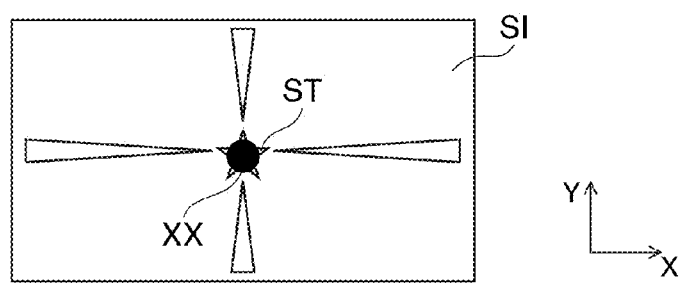
FIG. 9D shows a case where the recognized position of the marker is superimposed on the center of the video image marker.

A variation of the virtual image display apparatus according to the present embodiment will be described below. In the virtual image display apparatus according to the variation, not only the marker member MP2 shown in FIGS. 8A and 8B is provided to allow the wearer to visually recognize the point XX indicated by the marker CR but also in the image display operation of the virtual image formation unit IP (see FIG. 1A and other figures), a video image marker SI, such as the one shown in FIG. 9A, is displayed as a virtual image formed by the image light GL. The video image marker SI indicates the range of a displayed image recognized by the wearer, and the wearer can view the video image marker SI and the point XX in comparison with each other. In the example shown in FIG. 9A, an image formed of four triangles that form a cross-hair mark and a star ST disposed at the center of the cross-hair mark is displayed as the video image marker SI. That is, the star ST is an image formed by a central light flux, the component of the image light GL that travels toward the reference plane SF (see FIG. 1A) in a direction substantially perpendicular thereto. Therefore, when the wearer recognizes that the star ST coincides with the point XX, a central portion of the central light flux coincides with the position of the eye, which corresponds to a situation in which desirable positional adjustment, such as the one shown in FIG. 1A, has been made. The point XX produced by the marker CR shown in FIG. 9B is a physical marker physically attached as part of the lens portion FL, and the registration mechanism 300 changes the physical position of the point XX in the X and Y directions. In contrast, the video image marker SI is a virtual image whose visibility depends on the exit angle of each light flux component that forms the image light GL from the virtual image formation unit IP, and the position of the virtual image recognized by the wearer therefore hardly changes even when the registration mechanism 300 (see FIG. 8A and other figures) moves, for example, the marker member MP2 in the X and Y directions. Therefore, when the video image marker SI is displayed under the condition that the point XX produced by the marker CR is recognizable, the video image marker SI and the point XX are superimposed on each other, and the wearer can recognize the relationship between the range of a displayed image indicated by the video image marker SI and the standard position SP of the virtual image formation unit IP. In this case, the point XX may not coincide with the star ST, which is the center of the video image marker SI, for example, as shown in FIG. 9C. The situation indicates that the wearer is viewing the image with the wearer's eye EY deviating from the second optical axis AX2, unlike in the ideal positional relationship, such as the one shown in FIG. 1A, that is, unlike in the case where the wearer's eye EY is located on the second optical axis AX2. The wearer can produce the optimum state, in which the wearer's eye EY is located on the second optical axis AX2, by using the registration mechanism 300 to adjust the position of the marker CR, that is, the position of the point XX in the X and Y directions in such a way that the point XX is superimposed on the star ST located at the center of the video image marker SI as shown in FIG. 9D.

As described above, in the present variation, the position of the virtual image formation unit IP relative to the eye EY can be adjusted without use of a mirror or any other tool but based on the relationship between the point XX corresponding to the standard position SP of the virtual image formation unit IP and the range of a displayed image indicated by the video image marker SI.

Further, in the above description, the structure of the marker member MP2 is presented by way of example, and the marker member MP2 may alternatively be formed of a member that protrudes forward in front of the eye EY and has a marker CR at the front end of the protruding portion. In this case, adjusting the length of the portion protruding forward allows the wearer to directly visually recognize the marker CR located at the front end with the eye EY, or the wearer can recognize the marker CR by using a mirror or any other tool.

Third Embodiment

A virtual image display apparatus according to a third embodiment will be described below. The virtual image display apparatus according to the present embodiment is a variation of the virtual image display apparatus 100 according to the first embodiment and is the same as the virtual image display apparatus 100 except part of the registration mechanism 300. Therefore, only part of the registration mechanism 300 will be described, and illustration and description of the entire apparatus will be omitted.

Figure 10:
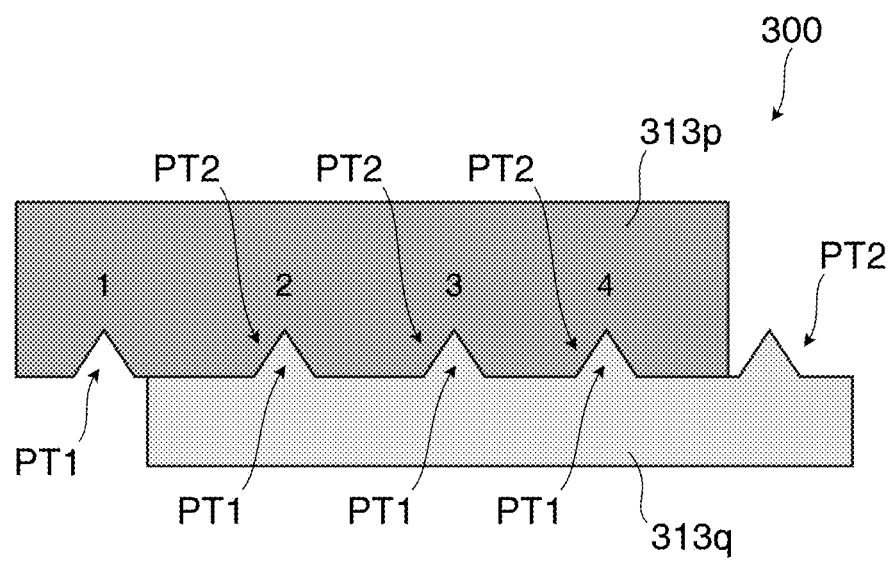
FIG. 10 describes a registration mechanism in a virtual image display apparatus according to a third embodiment.

FIG. 10 corresponds to the screw mechanisms 313 and 323 in the registration mechanism 300 shown in FIG. 3A and other figures and shows a pair of groove-shaped and protrusion-shaped positioning portions 313p and 313q discretely arranged at fixed intervals in the adjustment direction, that is, in the upward and downward directions (Y direction) or the rightward and leftward directions (X direction). That is, the screw structures are replaced with a structure that allows discrete movement. Specifically, the pair of positioning portions 313p and 313q have a plurality of groove-shaped portions PT1 and protrusion-shaped portions PT2 formed at equal intervals greater than or equal to 0.5 mm but smaller than or equal to 1 mm or at equal intervals sized close to the above range. Relative slide movement between the positioning portions 313p and 313q provides discrete-motion positioning with a clicking sensation. Further, the groove-shaped portions PT1 or the protrusion-shaped portions PT2 are labeled with numerals as shown in FIG. 10, whereby the wearer can readily check an adjusted position for the wearer provided in the discrete adjustment process.

Fourth Embodiment

A virtual image display apparatus according to a fourth embodiment will be described below. The virtual image display apparatus according to the present embodiment is a variation of the virtual image display apparatus according to the second embodiment, and illustration and description of the entire apparatus will therefore be omitted.

Figure 11A:
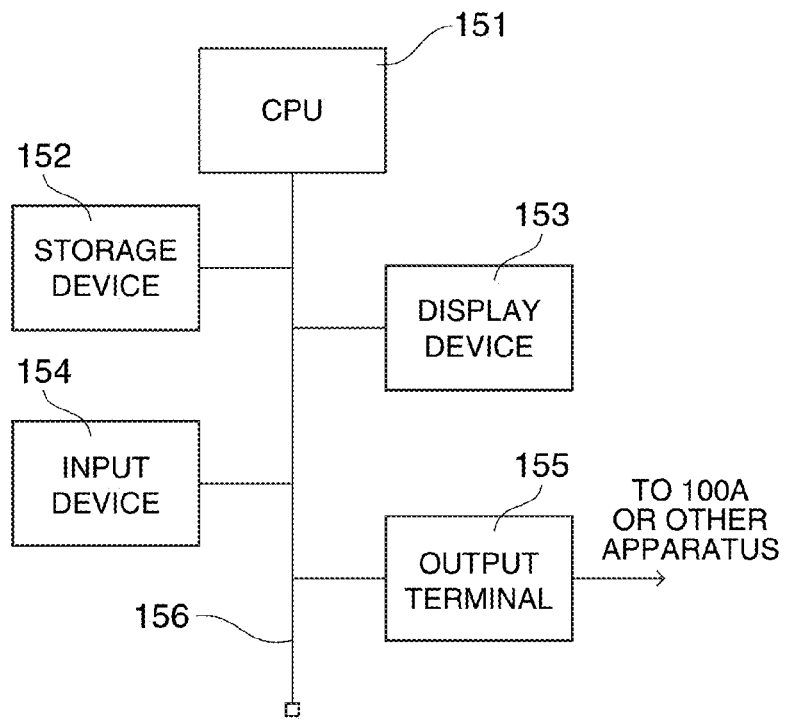
FIG. 11A is a block diagram for describing a registration mechanism in a virtual image display apparatus according to a fourth embodiment.

In the present embodiment, for example, after the discrete-motion positional adjustment is made as shown in FIG. 10, a storage device stores information on the adjusted position. Specifically, the virtual image display apparatus 100 includes a control unit 150 that receives a variety of instructions from the wearer, as shown in FIG. 11A.

The control unit 150 includes a CPU 151, a storage device 152, a display device 153, an input device 154, an output terminal 155, and a bus 156.

The CPU 151 allows data transmission and reception among the storage device 152, the display device 153, and the input device 154 via the bus 156. Further, the CPU 151 reads a predetermined program and data from the storage device 152 in response to a wearer's instruction through the input device 154 and executes a variety of processes based on the program and the data. The CPU 151 transmits output information, for example, image information via the output terminal 155, for example, to the display apparatus 100A, which is the main unit of the virtual image display apparatus 100.

Figure 11B:
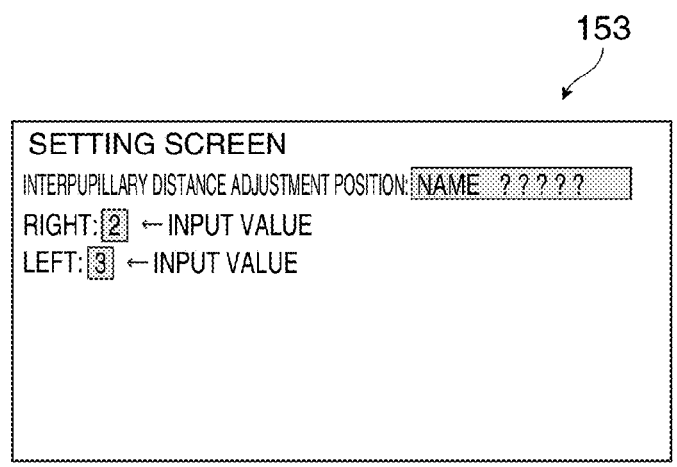
FIG. 11B shows a displayed image.

In the above description, the storage device 152 functions as an information storage section that stores the amount of adjustment made by the registration mechanism (not shown). Specifically, the control unit 150 can instruct the storage device 152 to store a name inputted by the wearer via the input device 154 and the amount of adjustment made for each of the right and left eyes. Further, the control unit 150 can read information stored in the storage device 152 and display the information on the display device 153 as shown in FIG. 11B in response to an instruction issued by the wearer via the input device 154. That is, the display device 153 functions as an information display section that can display information stored in the storage device 152, which is the information storage section, and show the information to the wearer. Based on the information displayed on the display device 153, the wearer can store information on an adjusted position suitable for each of the wearer's eyes in the control unit 150 as required and read the information via the input device 154 when necessary. The storage device 152 can also store information on adjusted positions, such as the one described above, for a plurality of wearers. Further, the registration mechanism may be provided with a drive section that allows automatic positional adjustment based on information read from the storage device 152.

Exemplary control operation of the positional adjustment by using the control unit 150, such as the one described above, will be described. First, the marker member MP1 (see FIG. 1A and other figures) is used to display the standard position SP (standard position display step), which allows the wearer to recognize a discrepancy between the standard position SP of the apparatus and the position of each of the eyes EY of the wearer. For example, the CPU 151 in the control unit 150 can check whether the wearer is wearing the apparatus and the position of each of the eyes EY of the wearer and the position of the point XX of the marker member MP1 based on an output from a sensor or any other component (not shown) attached, for example, to the display apparatus 100A, calculate any discrepancy between the standard position SP and the position of the eye EY of the wearer based on the relative positional relationship between the two positions, and display the calculation result on the display device 153. Further, the CPU 151 in the control unit 150 can show the wearer an appropriate adjusted position based on the standard position displayed in the standard position display step. Further, the CPU 151 may be configured to store information on an adjusted position that is a result from the adjustment made by the registration mechanism 300 in the storage device 152, which is an information storage section (adjusted position storage step). As described above, registration according, for example, to person-to-person differences in interpupillary distance can be readily achieved in the standard position display step, and re-registration can be readily and quickly achieved based on the information stored in the storage device 152.

Fifth Embodiment

A virtual image display apparatus according to a fifth embodiment will be described below. The virtual image display apparatus according to the present embodiment is a variation of the virtual image display apparatus 100 according to the first embodiment, and portions that will not be particularly described are the same as those of the virtual image display apparatus 100.

Figure 12A:
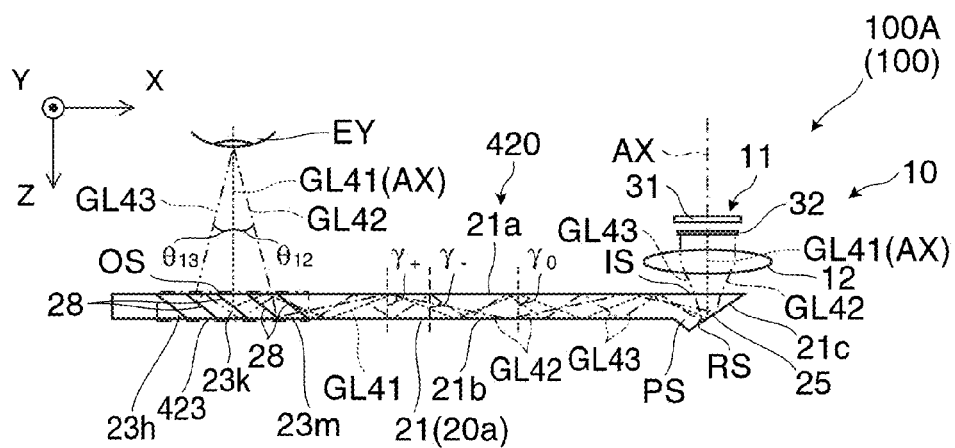
FIG. 12A is a cross-sectional view showing a virtual image display apparatus according to a fifth embodiment.
Figure 12B:
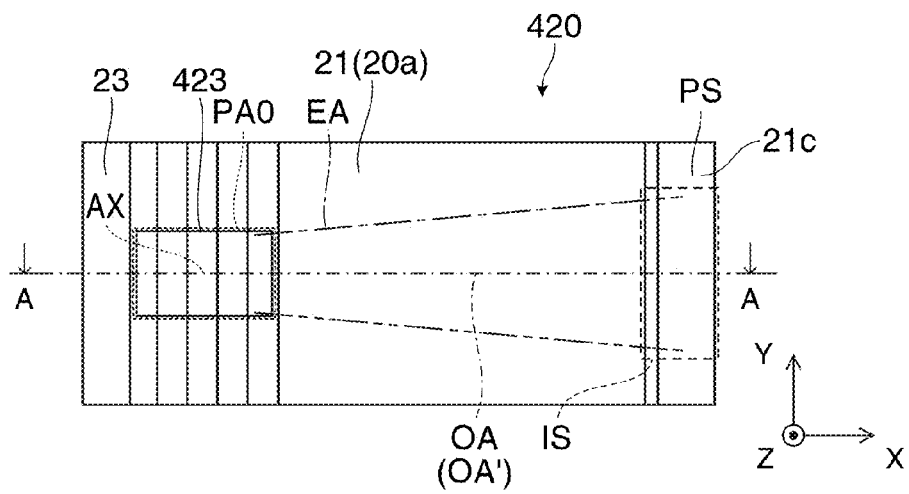
FIG. 12B is a front view of a light guide unit.
Figure 12C:
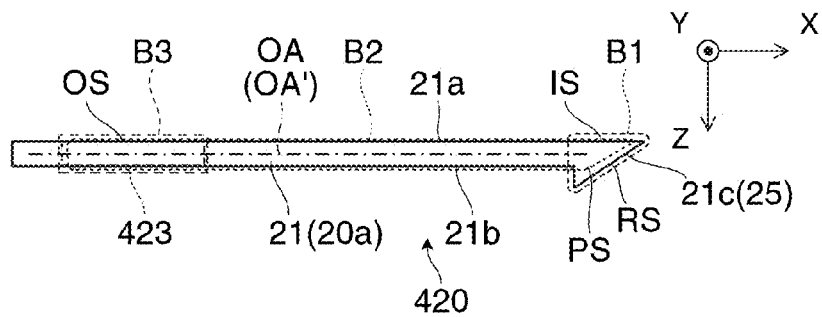
FIG. 12C is a plan view of the light guide unit.

A virtual image display apparatus 100 shown in FIGS. 12A to 12C includes a set of an image formation unit 10 and a light guide unit 420 for each of the eyes. The light guide unit 420 includes a light guide member 21, an angle conversion section 423, and a light transmissive member 23. FIG. 12A corresponds to the cross section of the light guide unit 420 shown in FIG. 12B taken along the line A-A. In this case, a marker member (not shown) that is a positioning member is provided in an area PA0 corresponding to the angle conversion section 423.

The overall exterior appearance of the light guide member 21 is formed by a body portion 20a, which is a flat plate extending in parallel to the XY plane in FIGS. 12A to 12C. The light guide member 21 has the following side surfaces: a first reflection surface 21a, a second reflection surface 21b, and a third reflection surface 21c. The light guide member 21 has a structure in which one end in the longitudinal direction has a prism portion PS, which is an extension of the body portion 20a, and has the third reflection surface 21c associated with the prism portion PS and the other end in the longitudinal direction has the angle conversion section 423 formed of a large number of mirrors.

The body portion 20a is made, for example, of a light-transmissive resin material and has a light incident surface IS provided on the rear flat surface parallel to the XY plane and facing the image formation unit 10, and the light incident surface IS introduces image light from the image formation unit 10. The body portion 20a has not only the light incident surface IS but also a rectangular inclined surface RS as a side surface of the prism portion PS, and a mirror layer 25 is formed on the inclined surface RS and covers the inclined surface RS. The mirror layer 25, which cooperates with the inclined surface RS, functions as the third reflection surface 21c inclined to the light incident surface IS. The third reflection surface 21c deflects the image light incident through the light incident surface IS and traveling as a whole in the +Z direction in such a way that the deflected light as a whole travels in the −X direction but inclined toward the −Z direction, whereby the image light is reliably introduced into the body portion 20a.

The first reflection surface 21a and the second reflection surface 21b of the light guide member 21 totally reflect the image light deflected off the prism portion PS. The image light reflected off the third reflection surface 21c is incident on and totally reflected off the first reflection surface 21a, incident on and totally reflected off the second reflection surface 21b, and guided toward the −X side after the image light repeatedly undergoes the action described above.

In the light guide member 21, the third reflection surface 21c and the light incident surface IS, the latter of which will be described later, function as a light incident portion B1, as shown in FIG. 12C. The body portion 20a, which is sandwiched between the first reflection surface 21a and the second reflection surface 21b of the light guide member 21, and the angle conversion section 423, which will be described later, function as a light guide portion B2. The angle conversion section 423 functions as a light exiting portion B3.

The angle conversion section 423 is formed on the far side (−X side) of the light guide member 21 along extension flat planes of the first reflection surface 21a and the second reflection surface 21b. A far-side end portion of the body portion 20a forms part of the angle conversion section 423. The angle conversion section 423 has a large number of half-silvered mirror layers 28 arranged at equal intervals in parallel to each other and inclined to the first reflection surface 21a and the second reflection surface 21b. The angle conversion section 423 reflects the image light incident thereon via the first reflection surface 21a and the second reflection surface 21b of the light guide member 21 at a predetermined angle of reflection and deflects the image light through a light exiting surface OS toward the wearer's eye EY. That is, the angle conversion section 423 converts the angle of the image light.

The light transmissive member 23 is an extension of the angle conversion section 423 extending toward the far side (−X side) and forms a flat-plate-shaped member similar to the body portion 20a of the light guide member 21.

In the above description, the entire angle conversion section 423 or a portion thereof located on the light entrance side, when cooperates with the light guide member 21, also functions as part of the light guide portion B2. Further, the entire angle conversion section 423 or a portion thereof located on the far side, when cooperates with the light transmissive member 23, functions as a see-through portion B4.

The image light having exited from the image formation unit 10 and entered the light guide member 21 through the light incident surface IS is uniformly reflected and deflected off the third reflection surface 21c, is repeatedly totally reflected off the first reflection surface 21a and the second reflection surface 21b of the light guide member 21, travels substantially along an optical axis AX with a fixed light flux width maintained, is further deflected off the angle conversion section 423 at an appropriate angle of deflection so that the image light has an extractable form, and finally exits through the light exiting surface OS associated with the angle conversion section 423. The image light having exited through the light exiting surface OS is incident on the wearer's eye EY as virtual image light.

The optical path of the image light in the light guide unit 420 will be described below. The light guide unit 420 in the fourth embodiment differs from the light guide unit 20 shown in FIG. 2, which guides image light in the two propagation modes.

As shown in FIG. 12A, it is assumed that the image light having exited from a liquid crystal display device (image light formation section) 32 in an image display section 11 is classified as follows: image light GL41 that is a component indicated by the dotted line extending from a central portion of a light exiting surface 32a; image light GL42 that is a component indicated by the chain line extending from a right portion of the light exiting surface 32a when viewed toward the plane of view (+X side); and image light GL43 that is a component indicated by the chain double-dashed line extending from a left portion of the light exiting surface 32a when viewed toward the plane of view (−X side).

Figure 13:
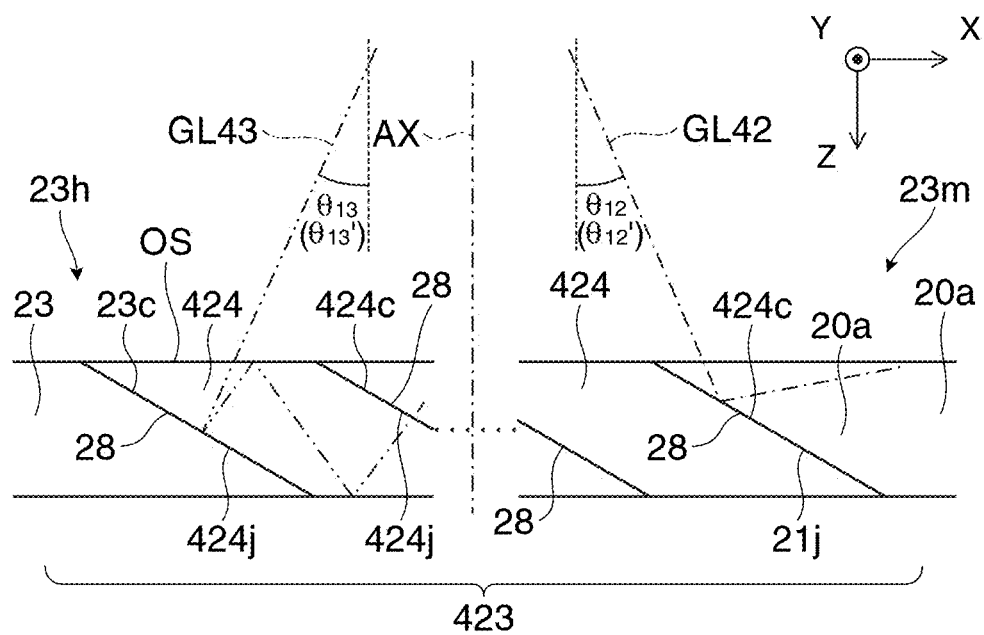
FIG. 13 is a diagrammatic view for describing the optical path of image light.

The image light fluxes GL41, GL42, and GL43, which are primary components, having exited through a projection system 12 are repeatedly totally reflected off the first reflection surface 21a and the second reflection surface 21b at angles of reflection $\gamma_0$, $\gamma_+$, and $\gamma_-$ different from each other. The image light GL41 is totally reflected N times (N is a natural number), reaches a central portion 23k of the angle conversion section 423, and exits as a parallelized light flux along the optical axis AX, which is perpendicular to the light exiting surface OS or the XY plane. The image light GL42 is totally reflected (N−M) times (M is a natural number), reaches a peripheral portion 23m of the angle conversion section 423, that is, a portion closest to the entrance of the angle conversion section 423 (+X side), and exits in a direction inclined to the optical axis AX by an angle $\theta_{12}$ ($\theta_{12}'$ in light guide unit 420) (see FIG. 13). The image light GL43 is totally reflected (N+M) times, reaches a peripheral portion 23h of the angle conversion section 423, that is, a portion closest to the far side of the angle conversion section 423 (−X side), and exits in a direction inclined to the optical axis AX by an angle $\theta_{13}$ ($\theta_{13}'$ in light guide unit 420) (see FIG. 13).

Figure 14:
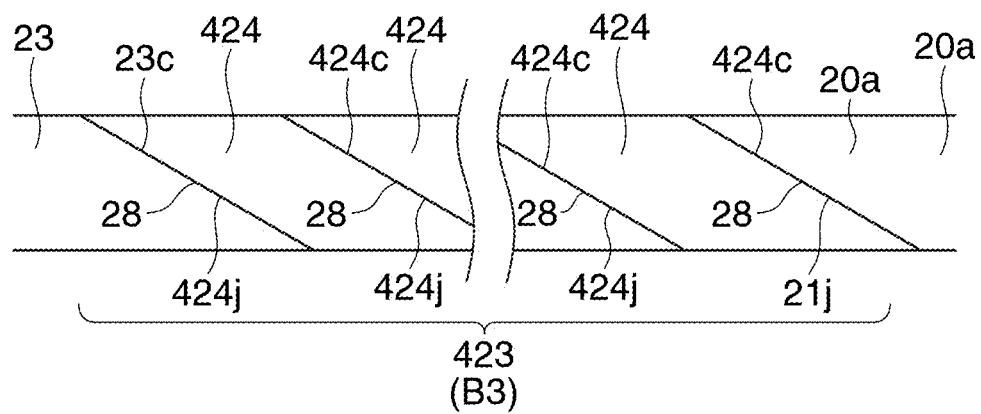
FIG. 14 is a cross-sectional view for describing a bonded portion including a half-silvered mirror layer.

The angle conversion section 423 has a structure in which a large number of prisms 424 are arranged at predetermined intervals in the X direction, as shown in FIG. 14. Each of the prisms 424 has a first bonded surface 424j on the light exiting side and a second bonded surface 424c on the light incident side. A half-silvered mirror layer 28, which is a semitransparent reflection film, is formed on a first bonded surface 21j of the body portion 20a and the first bonded surface 424j of each of the prisms 424.

Sixth Embodiment

A virtual image display apparatus according to a sixth embodiment will be described below. The virtual image display apparatus according to the present embodiment is a variation of the virtual image display apparatus 100 according to the first embodiment, and portions that will not be particularly described are the same as those of the virtual image display apparatus 100.

Figure 15A:
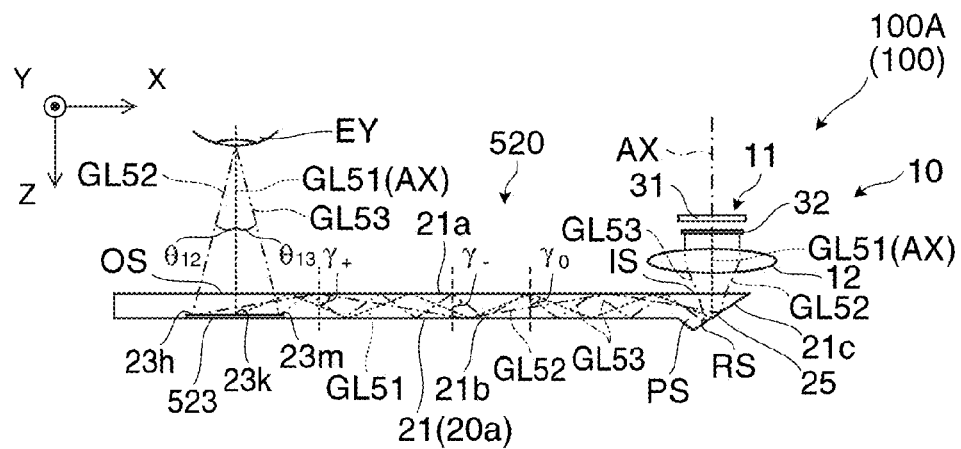
FIG. 15A is a cross-sectional view showing a virtual image display apparatus according to a sixth embodiment.
Figure 15B:
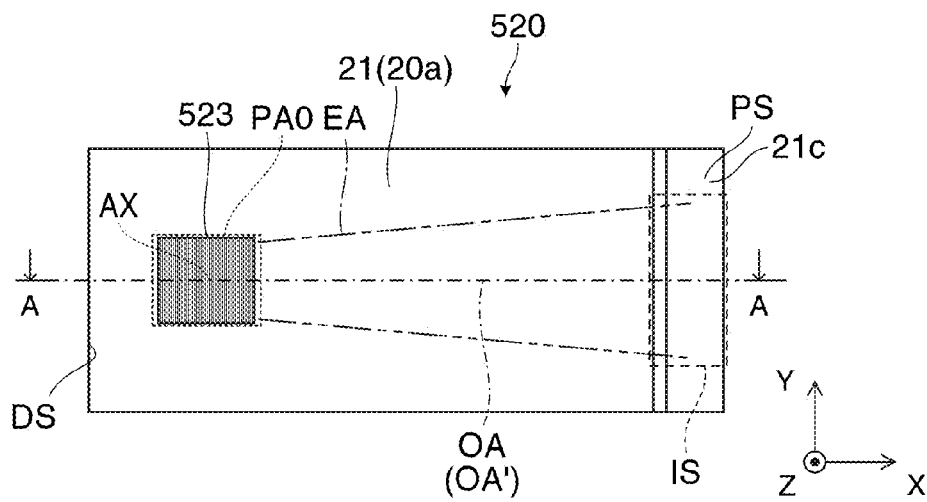
FIG. 15B is a front view of a light guide unit.
Figure 15C:
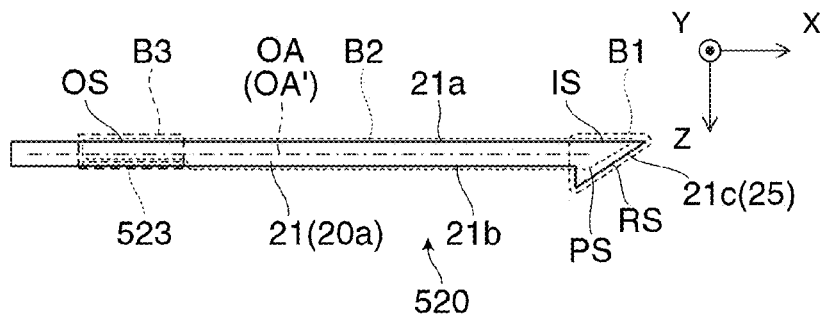
FIG. 15C is a plan view of the light guide unit.

A virtual image display apparatus 100 shown in FIGS. 15A to 15C includes a set of an image formation unit 10 and a light guide unit 520 for each of the eyes. The light guide unit 520 includes a light guide member 521 as part thereof. The light guide member 521 includes a body portion 20a and an angle conversion section 523, which is an image extracting portion. FIG. 15A corresponds to the cross section of the light guide member 521 shown in FIG. 15B taken along the line A-A. In this case, a marker member (not shown) that is a positioning member is provided in an area PA0 corresponding to the angle conversion section 523.

The overall exterior appearance of the light guide member 521 is formed by a body portion 20a, which is a flat plate extending in parallel to the XY plane in FIGS. 15A to 15C. The light guide member 521 has the following side surfaces: a first reflection surface 21a, a second reflection surface 21b, and a third reflection surface 21c. The light guide member 521 has a structure in which one end in the longitudinal direction has a prism portion PS, which is an extension of the body portion 20a, and has the third reflection surface 21c associated with the prism portion PS and the other end in the longitudinal direction has the angle conversion section 523 formed of a large number of minute mirrors embedded in the body portion 20a. The light guide member 521, which is an integrally formed part, can be divided into a light incident portion B1, a light guide portion B2, and a light exiting portion B3 (see FIG. 15C), as in the first embodiment. The light incident portion B1 has the third reflection surface 21c and a light incident surface IS, which will be described later. The light guide portion B2 has the first reflection surface 21a and the second reflection surface 21b. The light exiting portion B3 has the angle conversion section 523 and a light exiting surface OS, which will be described later.

In the body portion 20a, the angle conversion section 523, which is a minute structure, is formed along a flat surface facing away from the light exiting surface OS. The body portion 20a extends from the third reflection surface 21c on the light entrance side to the angle conversion section 523 on the far side and guides the image light incident via the prism portion PS to the angle conversion section 523.

The angle conversion section 523 is formed on the far side (−X side) of the light guide member 521 along an extension flat plane of the second reflection surface 21b in the vicinity of the extension flat plane. The angle conversion section 523 reflects the image light incident thereon via the first reflection surface 21a and the second reflection surface 21b of the light guide member 521 at a predetermined angle of reflection and deflects the image light toward the light exiting surface OS. That is, the angle conversion section 523 converts the angle of the image light.

The image light having exited from the image formation unit 10 and entered the light guide member 521 through the light incident surface IS is uniformly reflected and deflected off the third reflection surface 21c, is repeatedly totally reflected off the first reflection surface 21a and the second reflection surface 21b of the light guide member 521, travels substantially along an optical axis AX with a fixed light flux width maintained, is further deflected off the angle conversion section 523 at an appropriate angle of deflection so that the image light has an extractable form, and finally exits through the light exiting surface OS. The image light having exited through the light exiting surface OS is incident on the wearer's eye EY as virtual image light. The virtual image light is focused on the retina of the wearer, whereby the wearer can recognize the image light, which forms a virtual image, such as video image light.

The optical path of the image light in the light guide unit 520 will be described below. The light guide unit 520 in the fifth embodiment differs from the light guide unit 20 shown in FIG. 2, which guides image light in the two propagation modes.

As shown in FIG. 15A, it is assumed that the image light having exited from a liquid crystal display device (image light formation section) 32 in an image display section 11 is classified as follows: image light GL51 that is a component indicated by the dotted line extending from a central portion of a light exiting surface 32a; image light GL52 that is a component indicated by the chain line extending from a right portion of the light exiting surface 32a when viewed toward the plane of view (+X side); and image light GL53 that is a component indicated by the chain double-dashed line extending from a left portion of the light exiting surface 32a when viewed toward the plane of view (−X side).

The image light fluxes GL51, GL52, and GL53, which are primary components, having exited through a projection system 12 are repeatedly totally reflected off the first reflection surface 21a and the second reflection surface 21b at angles of reflection $\gamma_0$, $\gamma_+$, and $\gamma_-$ different from each other. The image light GL51 is totally reflected off the first reflection surface 21a and the second reflection surface 21b N times (N is a natural number). The image light GL52 is totally reflected (N−M) times (M is a natural number). The image light GL53 is totally reflected (N+M) times. Each of the image light fluxes GL51, GL52, and GL53 exits as a parallelized light flux (see FIG. 16).

Figure 16:
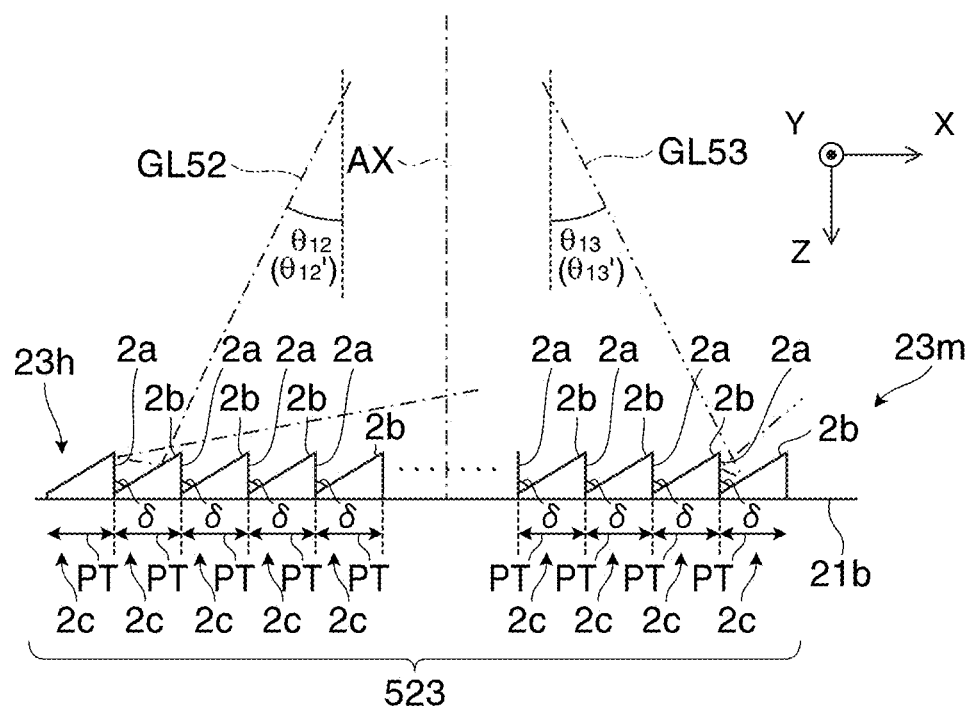
FIG. 16 is a diagrammatic view for describing the optical path of image light.

The angle conversion section 523 is formed of a large number of linear reflection units 2c arranged to form stripes, as shown in FIG. 16. That is, the angle conversion section 523 is formed by arranging a large number of elongated reflection units 2c extending in the Y direction at predetermined intervals PT along a primary light guiding direction in which the angle conversion section 523 extends, that is, in the −X direction. Each of the reflection units 2c has a set of a first reflection surface 2a, which is one reflection surface portion disposed on the far side, that is, the downstream side of the optical path, and a second reflection surface 2b, which is the other reflection surface portion disposed on the light entrance side, that is, the upstream side of the optical path, and the two reflection surfaces 2a and 2b form a fixed wedge angle δ. At least the second reflection surface 2b of the two reflection surfaces is a partial reflection surface capable of transmitting part of light and allows the wearer to view an environment light image in see-through observation. In each of the reflection units 2c, the image light fluxes GL52 and GL53 are first reflected off the first reflection surface 2a, which is located on the far side, that is, the −X side, and then reflected off the second reflection surface 2b, which is located on the light entrance side, that is, the +X side. The image light fluxes GL52 and GL53 reflected off each of the reflection units 2c are not reflected off the other reflection units 2c but deflected after only one passage through the reflection unit 2c in the angle conversion section 523 at a desired angle of deflection and extracted toward the wearer.

Seventh Embodiment

A virtual image display apparatus according to a seventh embodiment will be described below. The virtual image display apparatus according to the present embodiment is a variation of the virtual image display apparatus 100 according to the first embodiment, and portions that will not be particularly described are the same as those of the virtual image display apparatus 100.

Figure 17:
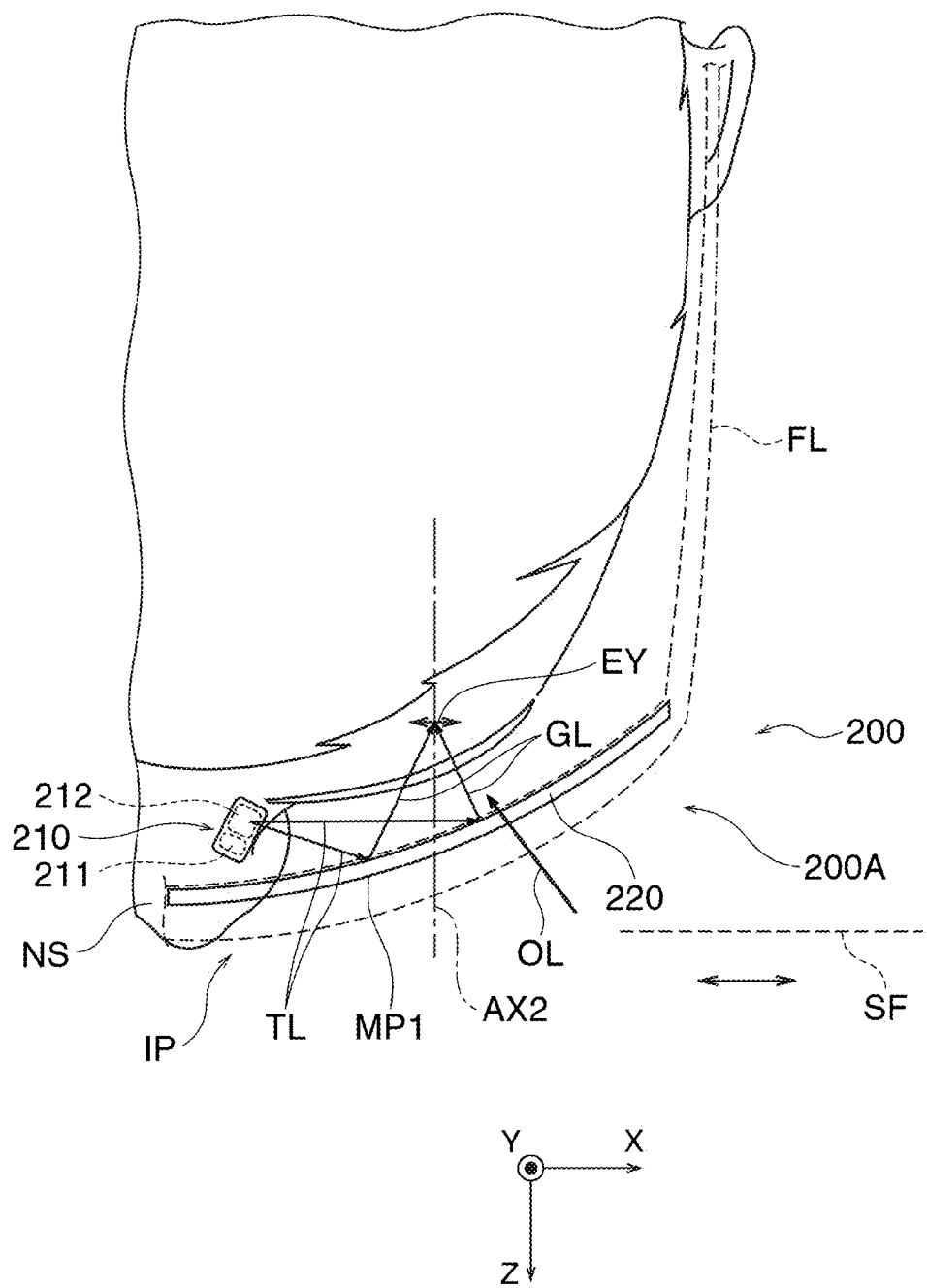
FIG. 17 shows a virtual image display apparatus according to a seventh embodiment.
Figure 18:
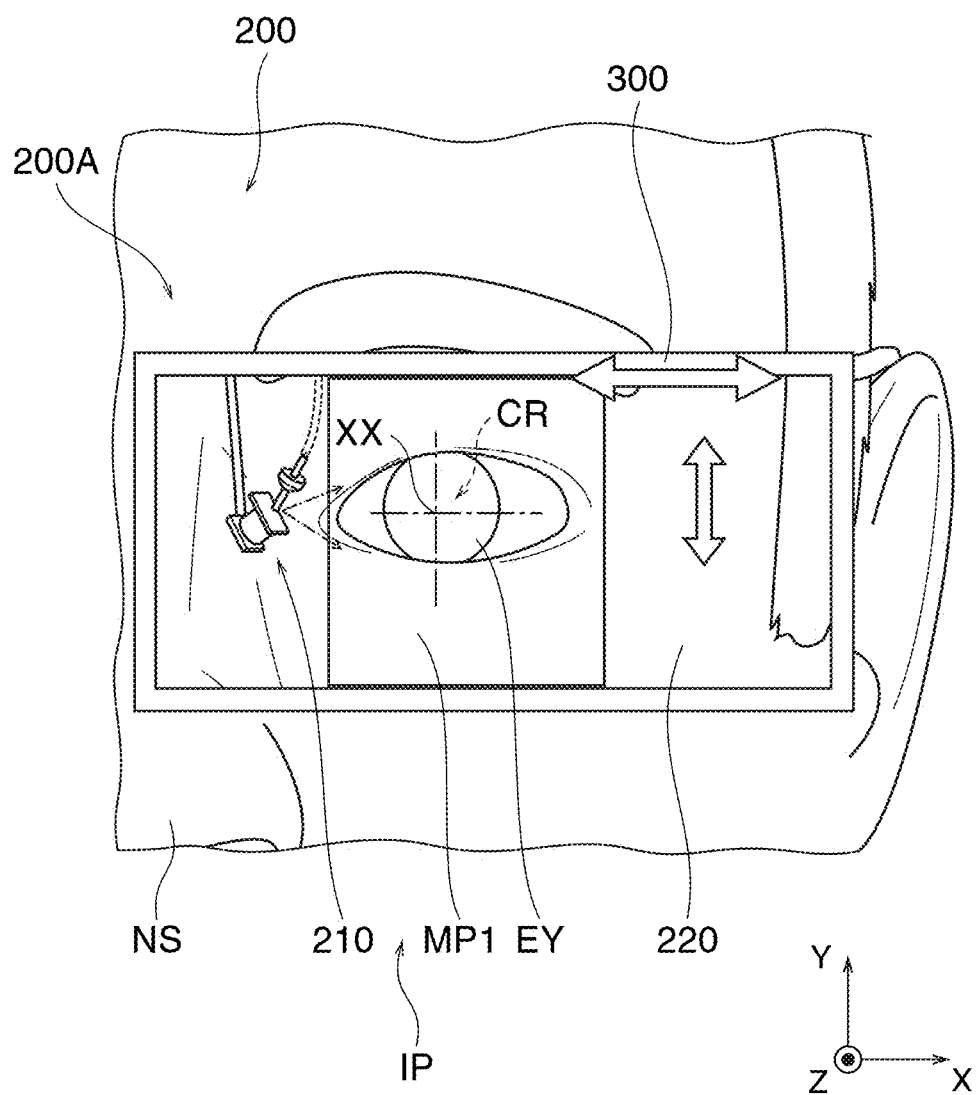
FIG. 18 describes positional adjustment of the virtual image display apparatus.

An example of the structure of a first display apparatus 200A of a virtual image display apparatus 200 according to the present embodiment with reference to FIGS. 17 and 18 will be described in order to describe an example of the structure of the virtual image display apparatus 200. The first display apparatus 200A includes a light output unit 210, which forms signal light and outputs the signal light as scanned light TL, an irradiated member 220, which receives the scanned light TL from the light output unit 210 to form image light GL, a marker member MP1, which is affixed to the irradiated member 220 and has a marker CR that produces a point XX corresponding to a standard position SP of the optical system, and a registration mechanism 300. The light output unit 210 includes a signal light modulator 211, which is disposed in a position somewhere around the nose NS of the wearer and works a signal light formation section, and a scan system 212. The irradiated member 220 is disposed in front of the light output unit 210 (on +Z side) and covers the front side of the wearer's eye EY. In the first display apparatus 200A, the light output unit 210 and the irradiated member 220, which actually form a virtual image, are assumed to be the virtual image formation unit IP. In FIGS. 17 and 18, in which the light output unit 210 and the irradiated member 220, which form the virtual image formation unit IP, are separate from each other, they are connected to each other in a portion not shown and can be integrally moved along with the marker member MP1 affixed to the irradiated member 220 by the registration mechanism 300.

The irradiated member 220 has a semitransparent reflection film that is an irradiated film (semitransparent film) irradiated with the scanned light and a support member that supports and fixes the semitransparent reflection film. That is, the irradiated member 220 is a half-silvered mirror, whereby the wearer's eye EY receives not only a virtual image but also light from the environment. The virtual image display apparatus 200 therefore has a see-through configuration that superimposes the two types of light and makes them observable.

The irradiated member 220 is disposed in front of the wearer's eye EY and on the opposite side of the light output unit 210 to the wearer (+Z side), as shown in FIG. 17. That is, the light output unit 210 is disposed between the wearer's eye EY and the irradiated member 220.

The irradiated member 220, which has a size large enough to cover the wearer's eye EY from the front, receives the scanned light TL traveling via the scan system 212 of the light output unit 210 in a direction inclined toward the +Z direction and reflects the scanned light TL to form a virtual image to be recognized by the wearer. The irradiated member 220 has a shape formed along the exterior appearance of the virtual image display apparatus 200, that is, the shape of a frame FL.

The image formation operation of the virtual image display apparatus 200 will be described below. First, the signal light modulator 211 of the light output unit 210 forms signal light produced by modulating illumination light in accordance with an image and outputs the signal light. The outputted signal light is incident on the scan system 212, which is a scanner. The scan system 212 outputs the signal light as scanned light toward the irradiated member 220. When the scanned signal light is incident on the irradiated member 220, a virtual image is formed from the image light GL and captured by the wearer's eye EY, and the image is thus recognized.

In the present embodiment as well as the embodiments described above, operating the registration mechanism 300 based on the point XX indicated by the marker CR of the marker member MP1 achieves optimum positional adjustment relative to the position of the wearer's eye EY. In this process, although each of the irradiated member 220 and the marker member MP1 affixed thereto has a curved shape, the registration mechanism 300 moves the virtual image formation unit IP in the X and Y directions, which are parallel to the reference plane SF perpendicular to the second optical axis AX2, as shown in FIG. 17. Setting the movement direction to be parallel to the reference plane SF prevents the action of the registration mechanism 300 from affecting the image formation. That is, even when the registration mechanism 300 moves the virtual image formation unit IP, the result of image formation will not be changed.

In the above description, a diode laser light source or an LED light source is used as a light source. The light source may alternatively be any other light source, such as an organic EL light source.

Others

The invention has been described with reference to the above embodiments, but the invention is not limited thereto. The invention can be implemented in a variety of other aspects to the extent that they do not depart from the substance of the invention. For example, the following variations are conceivable.

In the above description, the virtual image display apparatus 100 is assumed to be a head-mounted display for specific description. The virtual image display apparatus 100 can alternatively be modified into a head-up display.

In the virtual image display apparatus 100 according to any of the embodiments described above, a set of display apparatus is provided in correspondence with the right and left eyes, but only one of the right and left eyes may be provided, for example, with the image formation unit 10 and the light guide unit 20 for monocular vision of an image. In this case, the registration mechanism 300 is used to make positional adjustment for one of the eyes provided with the display apparatus.

When the right and left eyes are each provided with a display apparatus, appropriate positional adjustment is achieved in consideration of the convergence angle and binocular parallax between the positions of the two eyes in 3D image observation.

In the embodiments described above, the first optical axis AX1 passing through the light incident surface IS and the second optical axis AX2 passing through the light exit surface OS are parallel to each other, but the optical axes AX1 and AX2 may alternatively be not parallel to each other.

In the embodiments described above, the half-silvered mirror layer 28 provided on the fourth reflection surface 21d of the light guide member 21 has a reflectance of 50% or lower so that the see-through observation has a higher priority, but the half-silvered mirror layer 28 may alternatively have a reflectance of 50% or higher so that the image light observation has a higher priority.

Further, in the first embodiment described above, for example, the mirror member MR is a member separate from the virtual image display apparatus 100 as shown in FIG. 5, but the virtual image display apparatus 100 may alternatively be provided with the mirror member MR. Specifically, the mirror member MR may be so disposed that it faces the wearer's eye EY, that is, the mirror surface of the mirror member MR is perpendicular to the second optical axis AX2, and is located on the opposite side of the marker member MP1 to the wearer's eye EY in the direction in which the second optical axis AX2 extends, whereby the wearer can recognize the wearer's eye EY and the marker member illuminated with the environment light OL. In this case, when the mirror member MR is, for example, so provided that it can be attached to and detached from the virtual image display apparatus 100, the mirror member MR will not block the sight of the wearer when the wearer observes image light.

Further, in the embodiments described above, the registration mechanism 300 in principle moves the entire virtual image formation unit IP, but the registration mechanism 300 may alternatively move only part of the optical system of the virtual image formation unit IP as long as the virtual image formation from image light GL is maintained. For example, in FIG. 1A and other figures, when the registration mechanism 300 can move at least the light guide unit 20 of the optical system of the virtual image formation unit, the registration mechanism 300 can function as a mechanism that adjusts the position of the optical system that forms a virtual image relative to the wearer's eye EY. It is therefore conceivable, for example, that the registration mechanism 300 only moves the light guide unit 20 provided that the image formation unit 10 makes correction of the optical design of the overall optical system as the registration mechanism 300 moves the light guide unit 20.

The entire disclosure of Japanese Patent Application No. 2012-051325, filed Mar. 8, 2012 is expressly incorporated by reference herein.

What is claimed is:

1. A virtual image display apparatus comprising:
   a virtual image formation unit that not only transmits environment light but also forms a virtual image from image light;
   a positioning member that is attached in a predetermined position corresponding to a standard position of an optical system of the virtual image formation unit, the positioning member displaying a marker that allows a wearer in an apparatus worn state in which the wearer is wearing the virtual image formation unit to recognize the standard position and hence works as an index for positioning; and
   a registration mechanism that moves the optical system of the virtual image formation unit and the positioning member attached to the optical system to adjust the position of the virtual image formation unit relative to a wearer's eye,
   wherein the positioning member is detachably provided in the predetermined position, the positioning member being detachable without detaching the optical system.

2. The virtual image display apparatus according to claim 1,
   wherein the registration mechanism is capable of making the adjustment in the apparatus worn state at least in a direction of an interpupillary distance of the wearer.

3. The virtual image display apparatus according to claim 2,
   wherein the registration mechanism is capable of making the adjustment along a plane perpendicular to an optical axis in a direction perpendicular to the interpupillary distance direction.

4. The virtual image display apparatus according to claim 1,
   wherein the virtual image formation unit includes a projection system that projects the image light from an image display section and a light guide unit having the following portions and forms the virtual image from the image light: a light incident portion that introduces the image light through the projection system into the light guide unit; a light guide portion that guides the image light introduced through the light incident portion; and a light exiting portion that extracts the image light having passed through the light guide portion out of the light guide unit, and
   the registration mechanism moves both the projection system and the light guide unit or at least the light guide unit along with the positioning member.

5. The virtual image display apparatus according to claim 1,
   wherein the virtual image formation unit includes a signal light modulator that forms signal light modulated in accordance with an image, a scan system that scans the modulated signal light and outputs the modulated signal light as scanned light, and an irradiated member irradiated with the scanned light from the scan system to form a virtual image from the image light, and
   the registration mechanism moves all the signal light modulator, the scan system, and the irradiated member or at least the irradiated member along with the positioning member.

6. The virtual image display apparatus according to claim 1,
   wherein the wearer is allowed to recognize the wearer's eye and the positioning member via a mirror member disposed to face the wearer's eye on the opposite side of the positioning member to the wearer's eye in an optical axis direction.

7. The virtual image display apparatus according to claim 1,
   wherein the positioning member displays a physical marker that allows the wearer to recognize the standard position, and
   the virtual image formation unit forms a video image marker that displays a range of a displayed image recognized by the wearer as a virtual image formed from the image light in such a way that the wearer can compare the range with the physical marker.

8. The virtual image display apparatus according to claim 1,
   wherein the registration mechanism has groove-shaped and protrusion-shaped positioning portions discretely arranged at fixed intervals in a direction in which the adjustment is made.

9. The virtual image display apparatus according to claim 8,
   further comprising an information storage section that stores information on the adjusted position discretely determined by using the positioning portions of the registration mechanism and an information display section capable of displaying the information stored in the information storage section to allow the wearer to look at the displayed information.

10. The virtual image display apparatus according to claim 1,
    wherein the positioning member is attached in the predetermined position based on the standard position defined to be a position through which the optical axis of the optical system of the virtual image formation unit passes.

11. A position adjustment method used with a virtual image display apparatus including a virtual image formation unit that not only transmits environment light but also forms a virtual image from image light, a positioning member that is attached in a predetermined position corresponding to a standard position of an optical system of the virtual image formation unit, the positioning member displaying a marker that allows a wearer in an apparatus worn state in which the wearer is wearing the virtual image formation unit to recognize the standard position and hence works as an index for positioning, a registration mechanism that moves the optical system of the virtual image formation unit and the positioning member attached to the optical system to adjust the position of the virtual image formation unit relative to a wearer's eye, and an information storage section that stores information on an adjusted position provided in the adjustment made by the registration mechanism, the method comprising:

displaying the standard position by using the positioning member to allow the wearer to recognize a discrepancy between the standard position and the position of the wearer's eye; and storing information on the adjusted position provided in the adjustment made by the registration mechanism based on the standard position displayed in the standard position display in the information storage section, wherein the positioning member is detachably provided in the predetermined position, the positioning member being detachable without detaching the optical system.

12. The virtual image display apparatus according to claim 1, wherein the positioning member is a transparent member that is attached to the virtual image formation unit in the predetermined position, and the positioning member works as the index in a positional adjustment of the virtual image formation unit.

13. The virtual image display apparatus according to claim 1, wherein the marker is a physical marker drawn on the positioning member.

14. The method according to claim 11, wherein the positioning member is a transparent member that is attached to the virtual image formation unit in the predetermined position, and the positioning member works as the index in a positional adjustment of the virtual image formation unit.

15. The method according to claim 11, wherein the marker is a physical marker drawn on the positioning member.

* * * * *